(12) United States Patent
Deutch

(10) Patent No.: US 12,217,071 B2
(45) Date of Patent: ***Feb. 4, 2025

(54) METHODS AND SYSTEMS FOR CONTENT GENERATION VIA TEMPLATES WITH RULES AND/OR TRIGGERS

(71) Applicant: COREL CORPORATION, Ottawa (CA)

(72) Inventor: Michael Deutch, Las Vegas, NV (US)

(73) Assignee: Corel Corporation, Ottawa (CA)

( * ) Notice: Subject to any disclaimer, the term of this patent is extended or adjusted under 35 U.S.C. 154(b) by 0 days.

This patent is subject to a terminal disclaimer.

(21) Appl. No.: 18/366,181

(22) Filed: Aug. 7, 2023

(65) Prior Publication Data

US 2023/0393869 A1   Dec. 7, 2023

Related U.S. Application Data

(63) Continuation of application No. 17/353,093, filed on Jun. 21, 2021, now Pat. No. 11,720,376, which is a continuation of application No. 16/581,937, filed on Sep. 25, 2019, now Pat. No. 11,126,444.

(60) Provisional application No. 62/735,880, filed on Sep. 25, 2018.

(51) Int. Cl.
| | |
|---|---|
| *G06F 9/451* | (2018.01) |
| *G06F 3/0481* | (2022.01) |
| *G06F 3/04812* | (2022.01) |
| *G06F 3/04817* | (2022.01) |
| *G06F 3/0486* | (2013.01) |
| *G06F 40/186* | (2020.01) |

(52) U.S. Cl.
CPC .......... *G06F 9/451* (2018.02); *G06F 3/04812* (2013.01); *G06F 3/04817* (2013.01); *G06F 3/0486* (2013.01); *G06F 40/186* (2020.01)

(58) Field of Classification Search
CPC .... G06F 9/451; G06F 40/186; G06F 3/04812; G06F 3/04817; G06F 3/0486
See application file for complete search history.

(56) References Cited

U.S. PATENT DOCUMENTS

| | | | |
|---|---|---|---|
| 2002/0163535 A1* | 11/2002 | Mitchell | G06F 8/38 715/744 |
| 2007/0112740 A1 | 5/2007 | Geva | |
| 2008/0109740 A1 | 5/2008 | Prinsen et al. | |

(Continued)

*Primary Examiner* — Stephen S Hong
*Assistant Examiner* — Darrin Hope
(74) *Attorney, Agent, or Firm* — Rosenberg, Klein & Lee

(57) ABSTRACT

Adding electronic content by a user within the prior art requires the user formats every item or uses a template that predetermines the position and type of content added. However, it would be beneficial to provide users with templates which provide rules which are applied to the content as it is added based upon aspects of the template and/or data associated with the content. It would be beneficial if such templates automatically associated format elements, icons, other display elements, sourced additional content etc. based upon aspects such as the region of the template the content is added or data associated with the content being added. Further, where rendering is based upon data associated with the content if the user modifies the rendered content then these changes should be beneficially reflected in the data associated with the content such that a subsequent rendering reflects the user adjustments, etc.

19 Claims, 11 Drawing Sheets

(56) References Cited

U.S. PATENT DOCUMENTS

| | | |
|---|---|---|
| 2008/0263467 A1 | 10/2008 | Wilkins |
| 2009/0307583 A1 | 12/2009 | Tonisson |
| 2010/0235571 A1 | 9/2010 | Ishii et al. |
| 2011/0307793 A1 | 12/2011 | Leitner et al. |
| 2014/0331124 A1 | 11/2014 | Downs et al. |
| 2016/0224909 A1 | 8/2016 | Garrard et al. |
| 2017/0048285 A1 | 2/2017 | Pearl et al. |

* cited by examiner

METHODS AND SYSTEMS FOR CONTENT GENERATION VIA TEMPLATES WITH RULES AND/OR TRIGGERS

FIELD OF THE INVENTION

This patent application claims the benefit of priority as a continuation of U.S. patent application Ser. No. 17/353,093 filed 21 Jun. 2021; which itself claims the benefit of priority as a continuation of U.S. patent application Ser. No. 16/581,937 filed Sep. 25, 2019 which has issued as U.S. Pat. No. 11,126,444; which itself claims priority from U.S. Provisional Patent Application 62/735,880 filed Sep. 25, 2018, the entire contents of each being incorporated herein by reference.

FIELD OF THE INVENTION

This invention relates to electronic content and more particularly to electronic content generation and electronic content templates for generating electronic content.

BACKGROUND OF THE INVENTION

Electronic content is employed in a wide variety of applications either directly wherein it is rendered upon a display or reduced to hard copy format rather than being in soft copy format. However, within the prior art adding content to any electronic document irrespective of its final use requires that either the user formats every item they add to achieve the desired effect or use a template that defines aspects of the rendering but also predetermines the position and type of any content added. For example, a graph template defines the axes labels, titles etc. whereas a presentation template may define the structure of the rendered slide. Accordingly, at one end of the spectrum the user must perform every aspect of the formatting and at the other end must "live" with the formatting of the template.

However, users would benefit from the use of templates which provide one or more rules which are applied to the content as it is added based upon aspects of the template and/or data associated with the content. Accordingly, such templates automatically associated format elements, icons, other display elements, sourced additional content etc. based upon aspects such as the region of the template the content is added or data associated with the content being added. Further, where rendering is based upon data associated with the content if the user modifies the rendered content then these changes should be beneficially reflected in the data associated with the content such that a subsequent rendering reflects the user adjustments, etc.

Other aspects and features of the present invention will become apparent to those ordinarily skilled in the art upon review of the following description of specific embodiments of the invention in conjunction with the accompanying figures.

SUMMARY OF THE INVENTION

It is an object of the present invention to address limitations within the prior art relating to electronic content and more particularly to electronic content generation and electronic content templates for generating electronic content.

In accordance with an embodiment of the invention there is provided a method comprising: adding an item of content to a rendered graphical user interface provided by a software application in execution upon a computer system;
applying a trigger of a plurality of triggers to the item of content;
applying a rule of a plurality of rules to the item of content; wherein
the rule of the plurality of rules is established in dependence upon the trigger of the plurality of triggers is triggered.

In accordance with an embodiment of the invention there is provided a system comprising: an electronic device comprising a display, a memory, and a microprocessor; wherein the memory stores computer executable instructions relating to a software application, the computer executable instructions providing for the software application to:
add an item of content to a rendered graphical user interface provided by a software application in execution upon a computer system;
apply a trigger of a plurality of triggers to the item of content;
apply a rule of a plurality of rules to the item of content; wherein
the rule of the plurality of rules is established in dependence upon the trigger of the plurality of triggers is triggered.

In accordance with an embodiment of the invention there is provided a method comprising: providing a template within a software application in execution upon a computer system which is
rendered to a user of the computer system;
receiving from the user an indication with respect to an item of content to be added to the rendered template; wherein
the indication comprises at least one of the item of content, an indication of the item of content, and a location for adding the item of content;
the template comprises at least one of a plurality of triggers and a plurality of rules;
the software application renders the item of content in dependence upon a rule of the plurality of rules; and
the rule of the plurality of rules is established in dependence upon a trigger of the plurality of triggers being triggered.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

Embodiments of the present invention will now be described, by way of example only, with reference to the attached Figures, wherein.

DETAILED DESCRIPTION

Figure 1:
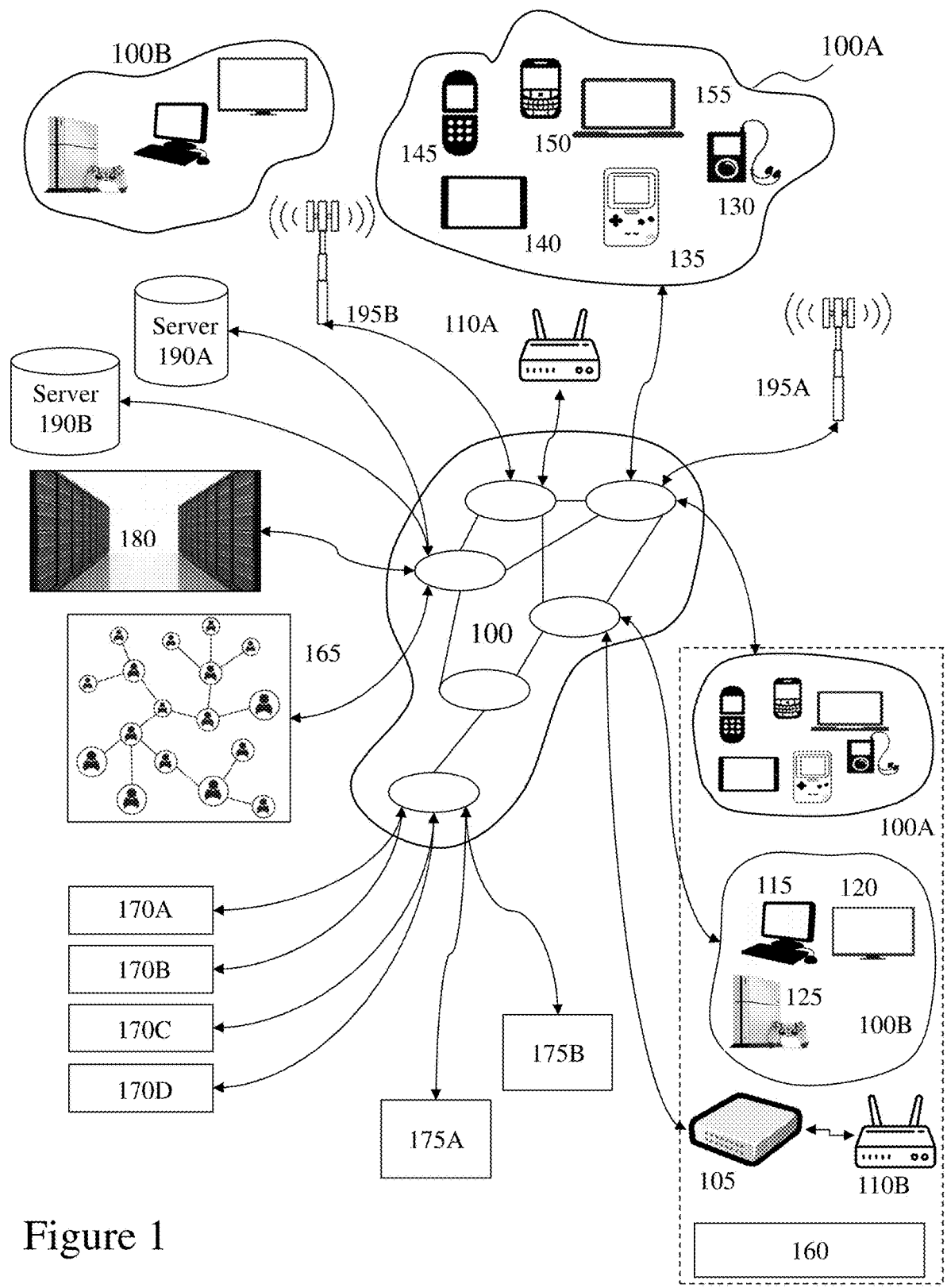
FIG. 1 depicts a network environment within which embodiments of the invention may be employed.

The present invention is directed to electronic content and more particularly to electronic content generation and electronic content templates for generating electronic content.

The ensuing description provides exemplary embodiment(s) only, and is not intended to limit the scope, applicability or configuration of the disclosure. Rather, the ensuing description of the exemplary embodiment(s) will provide those skilled in the art with an enabling description for implementing an exemplary embodiment. It being understood that various changes may be made in the function and arrangement of elements without departing from the spirit and scope as set forth in the appended claims.

A "portable electronic device" (PED) as used herein and throughout this disclosure, refers to a wireless device used for communications and other applications that requires a battery or other independent form of energy for power. This includes devices, but is not limited to, such as a cellular telephone, smartphone, personal digital assistant (PDA), portable computer, pager, portable multimedia player, portable gaming console, laptop computer, tablet computer, and an electronic reader.

A "fixed electronic device" (FED) as used herein and throughout this disclosure, refers to a wireless and/or wired device used for communications and other applications that requires connection to a fixed interface to obtain power. This includes, but is not limited to, a laptop computer, a personal computer, a computer server, a kiosk, a gaming console, a digital set-top box, an analog set-top box, an Internet enabled appliance, an Internet enabled television, and a multimedia player.

A "software application", also referred to as an "application" or "app", as used herein may refer to, but is not limited to, a "standalone software application", an element of a "software suite", a computer program designed to allow an individual to perform an activity, a computer program designed to allow an electronic device to perform an activity, and a computer program designed to communicate with local and/or remote electronic devices. An application thus differs from an operating system (which runs a computer), a utility (which performs maintenance or general-purpose chores), and a programming tools (with which computer programs are created). Generally, within the following description with respect to embodiments of the invention an application is generally presented in respect of software permanently and/or temporarily installed upon a PED and/or FED.

An "enterprise" as used herein may refer to, but is not limited to, a provider of a service and/or a product to a user, customer, or consumer. This includes, but is not limited to, a retail outlet, a store, a market, an online marketplace, a manufacturer, an online retailer, a charity, a utility, and a service provider. Such enterprises may be directly owned and controlled by a company or may be owned and operated by a franchisee under the direction and management of a franchiser.

A "service provider" as used herein may refer to, but is not limited to, a third party provider of a service and/or a product to an enterprise and/or individual and/or group of individuals and/or a device comprising a microprocessor. This includes, but is not limited to, a retail outlet, a store, a market, an online marketplace, a manufacturer, an online retailer, a utility, an own brand provider, and a service provider wherein the service and/or product is at least one of marketed, sold, offered, and distributed by the enterprise solely or in addition to the service provider.

A 'third party' or "third party provider" as used herein may refer to, but is not limited to, a so-called "arm's length" provider of a service and/or a product to an enterprise and/or individual and/or group of individuals and/or a device comprising a microprocessor wherein the consumer and/or customer engages the third party but the actual service and/or product that they are interested in and/or purchase and/or receive is provided through an enterprise and/or service provider.

A "user" as used herein may refer to, but is not limited to, an individual or group of individuals whose biometric data may be, but not limited to, monitored, acquired, stored, transmitted, processed and analysed either locally or remotely to the user wherein by their engagement with a service provider, third party provider, enterprise, social network, social media etc. via a dashboard, web service, website, software plug-in, software application, graphical user interface acquires, for example, electronic content. This includes, but is not limited to, private individuals, employees of organizations and/or enterprises, members of community organizations, members of charity organizations, men, women, children, teenagers, and animals. In its broadest sense the user may further include, but not be limited to, software systems, mechanical systems, robotic systems, android systems, etc. that may be characterised by providing a gesture or data relating to a gesture to a software application.

A "wearable device" or "wearable sensor" relates to miniature electronic devices that are worn by the user including those under, within, with or on top of clothing and are part of a broader general class of wearable technology which includes "wearable computers" which in contrast are directed to general or special purpose information technologies and media development. Such wearable devices and/or wearable sensors may include, but not be limited to, smartphones, smart watches, e-textiles, smart shirts, activity trackers, smart glasses, environmental sensors, medical sensors, biological sensors, physiological sensors, chemical sensors, ambient environment sensors, position sensors, neurological sensors, drug delivery systems, medical testing and diagnosis devices, and motion sensors.

"Electronic content" (also referred to as "content" or "digital content") as used herein may refer to, but is not limited to, any type of content that exists in the form of digital data as stored, transmitted, received and/or converted wherein one or more of these steps may be analog although generally these steps will be digital. Forms of digital content include, but are not limited to, information that is digitally broadcast, streamed or contained in discrete files. Viewed narrowly, types of digital content include popular media types such as MP3, JPG, AVI, TIFF, AAC, TXT, RTF, HTML, XHTML, PDF, XLS, SVG, WMA, MP4, FLV, and PPT, for example, as well as others, see for example http://en.wikipedia.org/wiki/List_of_filejormats. Within a broader approach digital content mat include any type of digital information, e.g. digitally updated weather forecast, a GPS map, an eBook, a photograph, a video, a Vine™, a blog posting, a Facebook™ posting, a Twitter™ tweet, online TV, etc. The digital content may be any digital data that is capable of being at least one of generated, selected, created, modified, and transmitted with a software application allowing a user of the software application to generate, select, create, modify, and edit visual and/or audiovisual content within the digital content.

Reference to a "document" as used herein may refer to, but is not limited to, any machine-readable and machine-storable work product. A document may be a file, a combination of files, one or more files with embedded links to other files, etc. The files may be of any type, such as text, audio, image, video, etc. Parts of a document to be rendered to an end user can be thought of as "content" of the document. A document may include "structured data" containing both content (words, pictures, etc.) and some indication of the meaning of that content (for example, e-mail fields and associated data, HTML tags and associated data, etc.). In the context of the Internet, a common document is a Web page. Web pages often include content and may include embedded information (such as meta-information, hyperlinks, etc.) and/or embedded instructions (such as Javascript, etc.). In many cases, a document has a unique, addressable, storage location and can therefore be uniquely identified by this addressable location such as a universal resource locator (URL) for example used as a unique address used to access information on the Internet. "Document information" as used herein may refer to, but is not limited to, may include any information included in the document, information derivable from information included in the document (referred to as "document derived information"), and/or information related to the document (referred to as "document related information"), as well as an extensions of such information (e.g., information derived from related information). An example of document derived information is a classification based on textual content of a document. Examples of document related information include document information from other documents with links to the instant document, as well as document information from other documents to which the instant document links.

A "gesture", also referred to as a "motion" or "input", as used herein may refer to, an action resulting in the movement and/or action of a mark making tool relative to a graphics image within a software application including, for example, a graphics generating tool, a graphics editing tool, and an image processing tool. As such a gesture may include, but not be limited to, a swipe, a tap, a motion, a press, and a click captured by the software application through an interface including, but not limited to, image processing, image capture, audio command, a user interface and a haptic interface.

A "gesture characteristic", also referred to as a "gesture expression" or an "expression", as used herein may refer to an aspect of a gesture exploited within a software application to modify a value relating to a mark making tool within the software application. As such as a gesture characteristic or expression may include, but not be limited, to velocity, direction, pressure, wheel, tilt, bearing, rotation, source of the gesture, and random. A source of the gesture may include, but not be limited to, a touchpad, a stylus, a mouse, keypad, keyboard, accelerometer or accelerometer derived data, tracked motion of a user or a predetermined portion of a user, an external image source, an external audiovisual source, an external multimedia source, biometric data of a user, and an item of environmental data. An expression or gesture characteristic may be applied to one or more behaviours/aspects of a mark making tool including, but not limited to, global chaos, local chaos, smoothness, damping, jitter, number, count, weighting, force, direction, mapping, colour, colour variability, resaturation, bleed, feature, grain, concentration, setting rate, viscosity, wetness, opacity and hardness.

A "user interface", also referred to as a "controller" or "haptic interface", as used herein may refer to a device and/or system capturing one or more actions of a user and providing these to a software application. Accordingly, a user interface may include an image capture/processing system, a gesture recognition system, a stylus, a wearable device, a touchscreen, a keypad, a mouse, a touchpad, a tablet, an accelerometer, and a motion recognition system.

Referring to FIG. 1 there is depicted a network environment 100 within which embodiments of the invention may be employed supporting content editing systems and content editing applications/platforms (CESCEAPs) according to embodiments of the invention. Such CESCEAPs, for example including digital graphics editor and digital painting applications. As shown first and second user groups 100A and 100B respectively interface to a telecommunications network 100. Within the representative telecommunication architecture, a remote central exchange 180 communicates with the remainder of a telecommunication service providers network via the network 100 which may include for example long-haul OC-48/OC-192 backbone elements, an OC-48 wide area network (WAN), a Passive Optical Network, and a Wireless Link. The central exchange 180 is connected via the network 100 to local, regional, and international exchanges (not shown for clarity) and therein through network 100 to first and second cellular APs 195A and 195B respectively which provide Wi-Fi cells for first and second user groups 100A and 100B respectively. Also connected to the network 100 are first and second Wi-Fi nodes 110A and 110B, the latter of which being coupled to network 100 via router 105. Second Wi-Fi node 110B is associated with Enterprise 160, e.g. Cisco™, within which are other first and second user groups 100A and 100B. Second user group 100B may also be connected to the network 100 via wired interfaces including, but not limited to, DSL, Dial-Up, DOCSIS, Ethernet, G.hn, ISDN, MoCA, PON, and Power line communication (PLC) which may or may not be routed through a router such as router 105.

Within the cell associated with first AP 110A the first group of users 100A may employ a variety of PEDs including for example, laptop computer 155, portable gaming console 135, tablet computer 140, smartphone 150, cellular telephone 145 as well as portable multimedia player 130. Within the cell associated with second AP 110B are the second group of users 100B which may employ a variety of FEDs including for example gaming console 125, personal computer 115 and wireless/Internet enabled television 120 as well as cable modem 105. First and second cellular APs 195A and 195B respectively provide, for example, cellular GSM (Global System for Mobile Communications) telephony services as well as 3G and 4G evolved services with enhanced data transport support. Second cellular AP 195B provides coverage in the exemplary embodiment to first and second user groups 100A and 100B. Alternatively the first and second user groups 100A and 100B may be geographically disparate and access the network 100 through multiple APs, not shown for clarity, distributed geographically by the network operator or operators. First cellular AP 195A as show provides coverage to first user group 100A and environment 170, which comprises second user group 100B as well as first user group 100A. Accordingly, the first and second user groups 100A and 100B may according to their particular communications interfaces communicate to the network 100 through one or more wireless communications standards such as, for example, IEEE 802.11, IEEE 802.15, IEEE 802.16, IEEE 802.20, UMTS, GSM 850, GSM 900, GSM 1800, GSM 1900, GPRS, ITU-R 5.138, ITU-R 5.150, ITU-R 5.280, and IMT-1000. It would be evident to one skilled in the art that many portable and fixed electronic devices may support multiple wireless protocols simultaneously, such that for example a user may employ GSM services such as telephony and SMS and Wi-Fi/WiMAX data transmission, VOIP and Internet access. Accordingly, portable electronic devices within first user group 100A may form associations either through standards such as IEEE 802.15 and Bluetooth as well in an ad-hoc manner.

Also connected to the network 100 are Social Networks (SOCNETS) 165, first and second graphics editors 170A and 170B respectively, e.g. Corel™ WordPerfect™ and Microsoft™ PowerPoint, first and second web based presentation tools 170C and 170D respectively, e.g. Prezi™ and Canva™, and first and second web based office tool suites 175A and 175B respectively, e.g. Google™ and OpenOffice™, as well as first and second servers 190A and 190B which together with others, not shown for clarity. First and second servers 190A and 190B may host according to embodiments of the inventions multiple services associated with a provider of content editing systems and content editing applications/platforms (CESCEAP s); a provider of a SOCNET or Social Media (SOME) exploiting CESCEAP features; a provider of a SOCNET and/or SOME not exploiting CESCEAP features; a provider of services to PEDS and/or FEDS; a provider of one or more aspects of wired and/or wireless communications; an Enterprise 160 exploiting CESCEAP features; license databases; content databases; image databases; content libraries; customer databases; websites; and software applications for download to or access by FEDs and/or PEDs exploiting and/or hosting CESCEAP features. First and second primary content servers 190A and 190B may also host for example other Internet services such as a search engine, financial services, third party applications and other Internet based services.

Accordingly, a user may exploit a PED and/or FED within an Enterprise 160, for example, and access one of the first or second primary content servers 190A and 190B respectively to perform an operation such as accessing/downloading an application which provides CESCEAP features according to embodiments of the invention; execute an application already installed providing CESCEAP features; execute a web based application providing CESCEAP features; or access content. Similarly, a GRADUS may undertake such actions or others exploiting embodiments of the invention exploiting a PED or FED within first and second user groups 100A and 100B respectively via one of first and second cellular APs 195A and 195B respectively and first Wi-Fi nodes 110A.

Each PED and/or FED supporting and/or exploiting CESCEAPs according to embodiments of the invention may comprise one or more processors and one or more memories (memory) coupled to processor(s). Such processors may include, but not be limited to, a microprocessor, a central processing unit (CPU), a digital signal processor (DSP), a reduced instruction set computer (RISC), and a complex instruction set computer (CIS C). Furthermore, the processor(s) may be part of application specific integrated circuits (ASICs) or may be a part of application specific standard products (ASSPs). The memory, may include, but not be limited to, physical media such as magnetic hard disk drive (HDD), solid-state HDD, or any combination of semiconductor devices such as registers, latches, ROM, EEPROM, flash memory devices, non-volatile random access memory devices (NVRAM), SDRAM, DRAM, double data rate (DDR) memory devices, SRAM, universal serial bus (USB) removable memory, etc.

Each PED and/or FED supporting and/or exploiting CESCEAPs according to embodiments of the invention may comprise one or more input and/or output interfaces including, but not limited to, a digital camera, a video input element (e.g. a video camera or camera), a microphone, a loudspeaker, a display, a keyboard, a keypad, a touchscreen, a mouse, and a touchpad. Such input interfaces allowing a user to input data such as commands, text, content etc. to be employed within a CESCEAP according to an embodiment of the invention Each PED and/or FED supporting and/or exploiting CESCEAPs according to embodiments of the invention may access and/or execute one or more software applications either stored in memory executable by a processor or accessed via a web browser interface (for example) executable by a processor allowing data and/or commands to be entered into a remote application in execution upon a remote server wherein the result of the entry of the data and/or commands a rendered to the user upon a display. Each PED and/or FED supporting and/or exploiting CESCEAPs according to embodiments of the invention may comprise one or more sensors such as an accelerometer providing three-dimensional motion input to the processor such as the user providing a gesture with their PED or a controller coupled to the PED and/or FED.

Each PED and/or FED supporting and/or exploiting CESCEAPs according to embodiments of the invention may comprise a protocol stack which includes a communication stack, e.g. an IEEE 802.11 protocol stack but alternatively may exploit other protocol stacks such as an Internet Engineering Task Force (IETF) multimedia protocol stack for example. Elements of a protocol stack may be implemented in any combination of software, firmware and/or hardware and, using IEEEE 802.11 as an example, comprise an IEEE 802.11-compatible physical layer (PHY) elements, an IEEE 802.11-compatible media access control (MAC) module 1230 coupled to an IEEE 802.2-compatible logical link control (LLC) module, a network layer Internet Protocol (IP) module, a transport layer User Datagram Protocol (UDP) module and a transport layer Transmission Control Protocol (TCP) module. Accordingly, each PED and/or FED supporting and/or exploiting CESCEAPs according to embodiments of the invention may enable a user to access one or more documents, to generate electronic content for inclusion within the one or more documents, and provide the user with a rendered result of adding the electronic content within the one or more documents. Accordingly, each PED and/or FED supporting and/or exploiting CESCEAPs according to embodiments of the invention may provide such functionality locally upon the PED and/or FED independent of any network; provide such functionality locally upon the PED and/or FED with an accessed template, for example; and provide access to such functionality remotely via CESCEAPs upon one or more remote servers; for example.

Each PED and/or FED supporting and/or exploiting CESCEAPs according to embodiments of the invention may also support one or more wireless and/or wired interfaces including, but not limited to, IEEE 802.3, IEEE 802.11, IEEE 802.15, IEEE 802.16, IEEE 802.20, UMTS, GSM 850, GSM 900, GSM 1800, GSM 1900, GPRS, ITU-R 5.138, ITU-R 5.150, ITU-R 5.280, IMT-1000, DSL, Dial- Up, DOCSIS, Ethernet, G.hn, ISDN, MoCA, PON, and Power line communication (PLC).

Figure 2A:
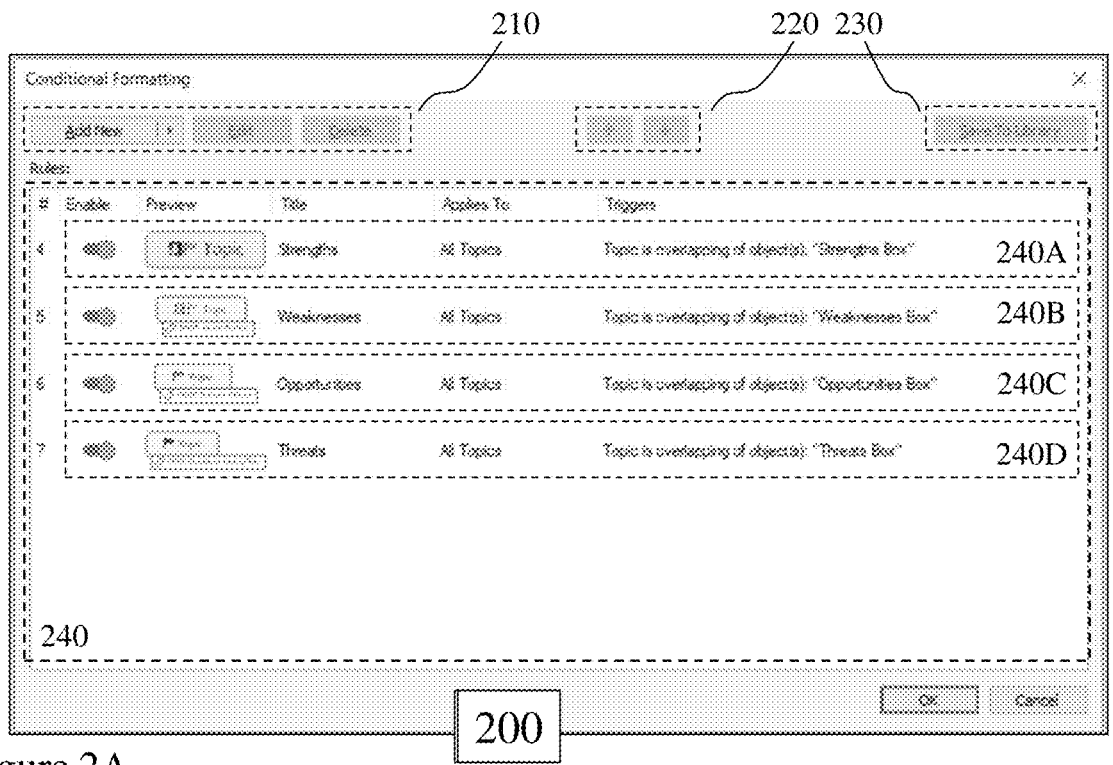
FIGS. 2A and 2B depict conditional format setting interfaces for a content template within a content editing system and content editing application/platform (CESCEAP) according to embodiments of the invention.
Figure 2B:
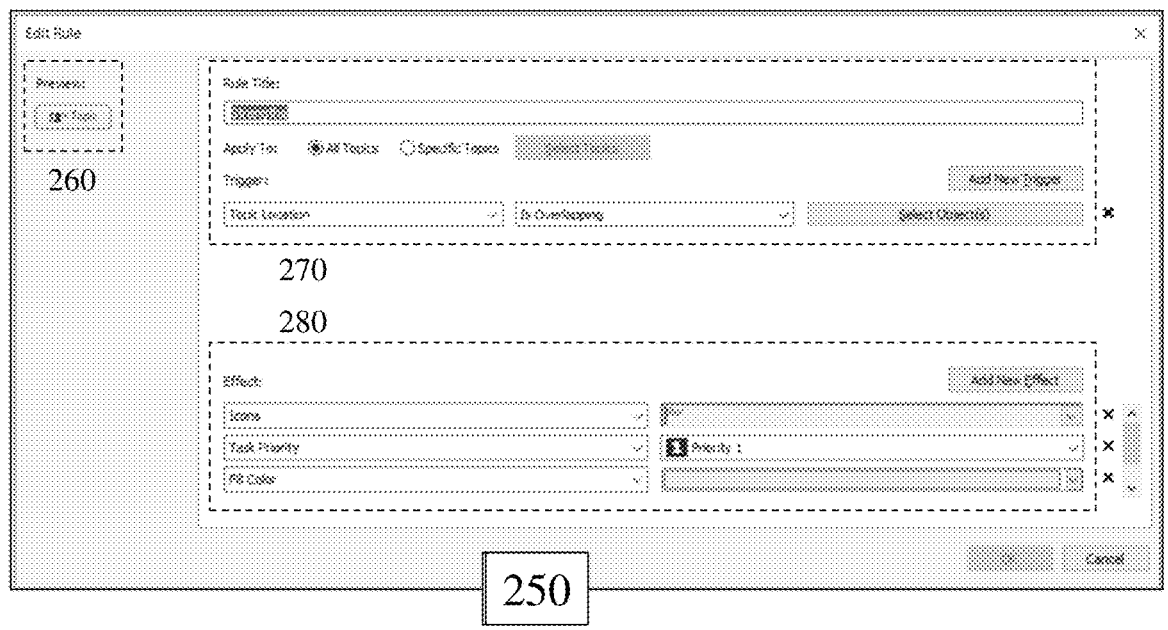

Referring to FIGS. 2A and 2B there are depicted first and second conditional format setting graphical user interfaces (GUIs) 200 and 250 for a content template within a content editing system and content editing application/platform (CESCEAP) according to embodiments of the invention. First conditional format setting GUI (CFS-GUI) 200A comprises first to third action user interfaces (ACT-UIs) 210 to 230 respectively and rule display 240 comprising first to fourth rules 240A to 240D respectively. Accordingly, with first ACT-UI 210 provides the user with the ability to add a new conditional formatting rule (CF-RULE) or if they have previously selected a displayed rule within the rule display 240 to edit it or delete it. Second ACT-UI 220 allows the user to navigate within the rule display 240 where the number of rules exceeds that which can be depicted in the rule display 240. Third ACT-UI 230 allows the user to save the rule to a library such that, for example, a rule generated within one document generated by a user within a CESCEAP may, for example, be accessed within another document within the same CESCEAP, accessed within another document within another CESCEAP, or be accessed by another user within another electronic document within either the same CESCEAP or another CESCEAP. Optionally, the CFS-GUI 200A may include additional ACT-UIs or variants of the first to third ACT-UIs depicted such that, for example, a user can access a rule within a library that they generated, access a rule established within a library by an organization and/or enterprise they are associated with, access a rule within a library where the rule was generated by another user, enterprise, organization etc., access a rule from a webpage and/or website, access a rule from a document accessed by a Uniform Resource Locator (URL) etc. where the URL was posted within a web page, web site, a SOCNET or a SOME for example.

Accordingly, within rule display 240 there are depicted first to fourth rules 240A to 240D which relate to the formatting of an item of content placed within a region of a content template, e.g. a Strengths-Weaknesses-Opportunities-Threats (SWOT) graphic such as depicted within FIGS. 3 to 10 respectively as described below. As depicted, each of the first to fourth rules 240A to 240D comprises several sections identified as "Enable", "Preview", "Title", "Applies To", and "Triggers." These may represent all sections or just some of the sections applicable within different embodiments of the invention. As depicted, these relate to:

"Enable" wherein the user can toggle the selector to enable or disable the rule;

"Preview" wherein the user is presented with a visual representation of how the rule will apply the conditional formatting;

"Title" wherein the section of the content template the rule relates to is indicated, in this instance, one of the Strengths, Weaknesses, Opportunities, and Threats portion of the template;

"Applies To" wherein any sub-rules relating to what content the rule applies to is indicated wherein this is indicated as "All Topics" but may be alternatively selectively applied to only text, only numeric content, only a hypertext, a subset of content forms, etc.; and "Triggers" wherein a trigger or triggers for the application of the rule is presented wherein some rules may have a single simple rule such as those indicated, namely the rule is applied simply based on the content added overlapping with the predetermined portion of the template, or these may be more complex rules such that conflicts may be addressed such as content overlapping two regions, a trigger requires a specific predetermined action to be completed, e.g. rule applies to items added after first pair or only applies to first 3 elements added, etc.

Accordingly, each of first to fourth rules 240A to 240D is associated with a single trigger wherein the electronic content added, referred to as a topic, overlaps either the "Strengths Box", "Weaknesses Box", "Opportunities Box", or "Threats Box" respectively. Each of these "boxes" being a predefined region of the template which as evident in FIGS. 3 to 10 respectively are easily evident to the user. Within other embodiments of the invention the region(s) of the template to which triggers are associated may not be as simple or evident to the user. Accordingly, as depicted in FIG. 20 a template in this scenario may indicate in an overlay or non-accessible manner the regions of the template within which triggers apply and indicate one or more aspects and/or effects of the rule(s) applicable.

Figure 20:
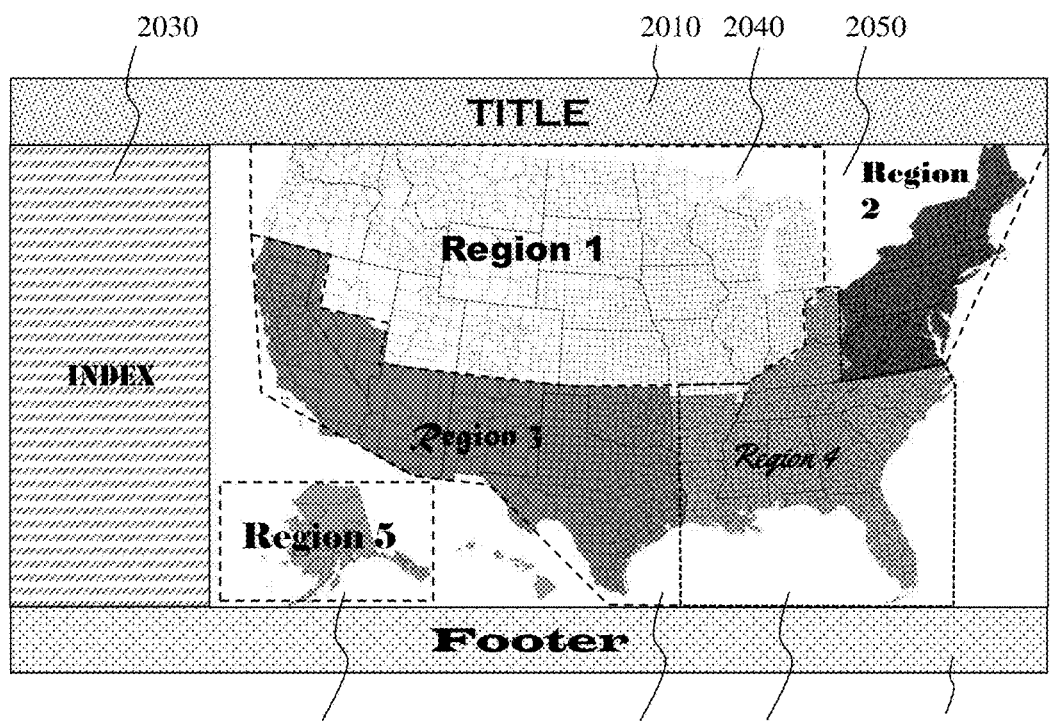
FIG. 20 depicts a template within a CESCEAP according to an embodiment of the invention to which conditional formatting rules are associated and providing a user with a visual guide to the regions of the template to which the rules are associated.

Referring to FIG. 20 there is depicted a map of the continental United States of America depicting first to eighth areas 2010 to 2080 respectively wherein each region is indicated either by a fill or dashed outline and has text indicated to the user. These fills, dashed lines, text, etc. being guides that are not depicted within a printed version of the slide, e.g. onto paper or within an electronic portable document format for example, or may be disabled for a version of the slide distributed for use within the native application, or may be only visible to the creator of the slide, for example. As depicted first to eighth areas 2010 to 2080 represent:

First area 2010 representing a title area for the slide;
Second area 2020 representing a footer for the slide;
Third area 2030 representing an index region of the slide;
Fourth area 2040 representing "Region 1";
Fifth area 2050 representing "Region 2";
Sixth area 2060 representing "Region 3";
Seventh area 2070 representing "Region 4"; and
Eighth 2080 representing "Region 5."

Now referring to FIG. 2B there is depicted second CFS-GUI 250 wherein a user has previously selected a rule within rule display 240 in FIG. 2A and then selected to edit the rule via first ACT-UI 210 in FIG. 2A. Accordingly, in this instance the user has selected first rule 240A and the second CFS-GUI 250 depicts a preview 260 of the rule, which is the same as that in the preview portion of the first rule 240A in rule display 240 in FIG. 2A. Also depicted are first and second formatting windows 270 and 280. Within first formatting window 270 as depicted the user can set a title for the rule, define to what the rule applies (e.g. "All Topics" or "Specific Topics" as indicated wherein if "Specific Topics" is enabled the user can select them), and define the triggers that apply as well as establish a new trigger if appropriate. Within second formatting window 280 the user can establish the visual formatting of the content displayed using the rule. As indicated the window presents the current effect(s), any priority indicators etc., any fill colour to a text box etc., and allow the user to add a new effect. Within embodiments of the invention the selection of "Add New Trigger" may provide a default option to the user allowing them to build the trigger themselves or they may be provided with a list of previously established triggers for the template generally or for templates having keywords within the rule title that match those for the rule the user is adding the trigger to. Accordingly, the user may be presented, for example in this example of "Strengths" with triggers established by the user previously, triggers established by other users accessible from one or more libraries, etc.

Within embodiments of the invention the selection of "Add New Effect" may provide a default option to the user allowing them to build the effect themselves or they may be provided with a list of previously established effects for the template generally or for templates having keywords within the rule title that match those for the rule the user is adding the effect to. Accordingly, the user may be presented, for example in this example of "Strengths" with effects established by the user previously, effects established by other users accessible from one or more libraries, etc.

Accordingly, as will become evident in respect of FIGS. 3 to 10 respectively a CESCEAP according to an embodiment of the invention allows for a content template to be generated which automatically applies one or more formatting rules to content typed, dragged-and-dropped, copy-pasted, etc. into the content template. Within the prior art a user accessing, for example, a Microsoft™ PowerPoint™ (PowerPoint) slide can establish through a toolbar at the top of the application one or more formats for text entered by the user such as font, text size, colour etc. which are applied to the text the user enters, having denoted to the PowerPoint application they are entering text. However, unless the user adjusts the defaults these are applied to all content the user adds to the PowerPoint slide irrespective of where within the slide the user adds the content. Alternatively, the user can access a PowerPoint template, either provided within PowerPoint directly or accessed from a third party, which allows for content to be entered and formatted according to the template. However, the template defines specific "text boxes" wherein selection of a text box applies the format for that selected text box. If the user drags and drops content from another application of copy-pastes content into any region of the template, then the defaults of the application are applied. The only exception being a copy-paste operating into a selected text box wherein the format of the selected text box is applied.

In contrast, the conditional formatting rules within a CESCEAP according to an embodiment of the invention are defined with respect to the display overall and are automatically applied when enabled without any selection of a "text box" by the user. Further, when a user selects a prior art "text box" then location of the entered content is pre-defined by the template whereas the initial position of content added by a user exploiting a CESCEAP according to an embodiment of the invention has the format for that region of the display (template) but the position as defined by the user as dragged-dropped in a single operation absent requiring the user to subsequently select items and move them around. It would also be evident from the exemplary "Previews" of the first to fourth rules 240A to 240D respectively that formatting of added content can be extended to include the addition of icons and borders as well as additional elements.

Accordingly, it would be evident that the rules within a CESCEAP according to an embodiment of the invention would also allow for the automatic addition of an image or other content to the content being added by the user. The addition of an icon, box, additional element, etc. being referred to by the inventors as the addition of an "effect" to the content being added. Accordingly, it would be evident to one of skill in the art that whilst the effects described and depicted with respect to FIGS. 2A to 10 respectively for a SWOT chart and FIGS. 11 to 19 respectively for an organization chart as exemplary descriptions of embodiments of the invention are relatively simple as required for ease of display, the format of document etc. that other more complex effects can be added or selected which are conditional upon the rules associated with them. For example, animations, automated bitmap images (e.g. animated Graphic Interchange Format (GIF) images)), images, audiovisual content, etc. may be added as effects. Further, within other embodiments of the invention the effect may be a real-time captured effect established in dependence upon detection of one or more keywords within the electronic content being added. Accordingly, for example, dragging electronic content denoting "stock price" into a region of a SWOT template for "Strengths" may in addition to formatting the text for that region of the template acquire a conditional effect of capturing the current stock price which is depicted alongside the text. This capture may be one-off such as when the content is added to the template or recurring such that each time the template is accessed a real-time capture is made of the additional information to add as the effect.

Whilst the embodiments of the invention are described and depicted with respect to a CESCEAP wherein the rules are defined within the CESCEAP, such that one or more rules may be applied to a specific region of the template, it would be evident that within other embodiments of the invention the rule applied may be established based upon the CESCEAP parsing a database of rules, e.g. a library of rules. Accordingly, if the user adds content within a SWOT template including the text "stock price" then the CESCEAP may search to see if a rule has been previously established within one or more libraries of rules which should be applied to the content being added. This library may define secondary effects such that the primary effects such as front, colour, icon, etc. are defined by the template in use but a secondary effect of acquiring a real-time stock price is added to the primary effects. Optionally, a user may be presented with one or more rules established from one or more libraries relating to the content they are adding and upon selecting one this is applied.

Accordingly, a user may access a SWOT template, drag a first item onto "Strengths" wherein they are presented with previews of conditional formatting options established from one or more databases, such as for example the user's personal library, a library specific to an organization or enterprise, a library specific to a third party service provider, etc. Accordingly, having selected the conditional formatting option this is then applied to all subsequent content added to the "Strength" region of the SWOT template.

Whilst the embodiments of the invention are described with respect to well known templates, e.g. a SWOT template and an organizational hierarchy, it would be evident to one of skill in the art that the conditional formatting rules may be associated with any pre-defined template such as provided with a CESCEAP supporting embodiments of the invention, as accessible by a CESCEAP supporting embodiments of the invention, accessible from a third party such as online, by purchase etc. Further, it would be evident that by establishing rules as depicted within FIGS. 2A and 2B the user may themselves generate the template for subsequent use.

Optionally, the ability of a user to access the conditional formatting rules for a template either to add, delete, modify, etc. may be restricted according to one or more factors including, but not limited to, the version of the CESCEAP employed, the identity of the user, a registration of a user with a CESCEAP, etc. using one or more techniques as known within the prior art. Accordingly, a user may be provided with a template in a freeware version of a CESCEAP according to an embodiment of the invention but may modify the template in a purchased or subscription version of the CESCEAP according to an embodiment of the invention wherein upon lapse of their subscription the ability to modify is terminated. Alternatively, a supervisor within an organization may have the ability to modify, add, delete rules in a template whereas other users can only simply add content etc.

Figure 3:
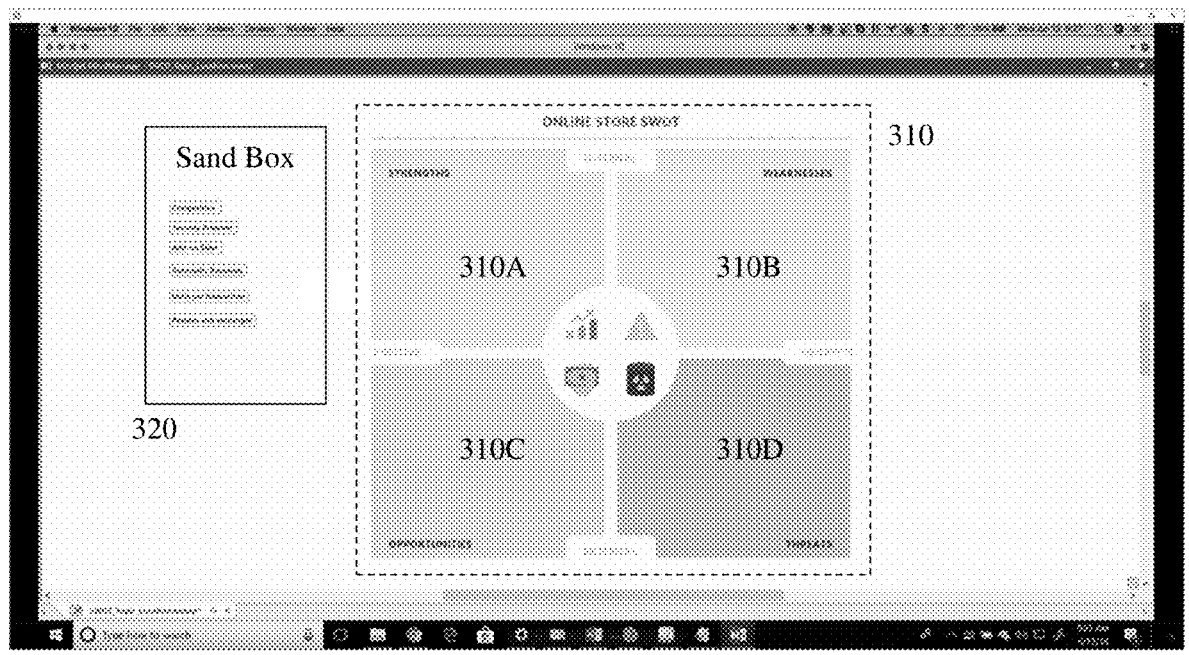
FIGS. 3 to 10 depict exemplary screenshots of a user adding content to a content template within a CESCEAP according to an embodiment of the invention.

Accordingly, referring to FIGS. 3 to 10 there are depicted exemplary screenshots of a user adding content to a content template within a CESCEAP according to an embodiment of the invention. Referring to FIG. 3 the user has accessed a template 310, a SWOT template, wherein the title has been edited to reflect that it relates to a SWOT for an online store. Accordingly, there are four regions, namely Strengths 310A, Weaknesses 310B, Opportunities 310C, and Threats 310D. Also depicted is a sandbox 310 wherein a user can enter text that they will then drag-drop onto the SWOT template 310. Alternatively, within embodiments of the invention a user may copy-paste directly into the SWOT template 310 without going via the sandbox 320 or select to add within a region and the rules are applied as the content is added.

Figure 4:
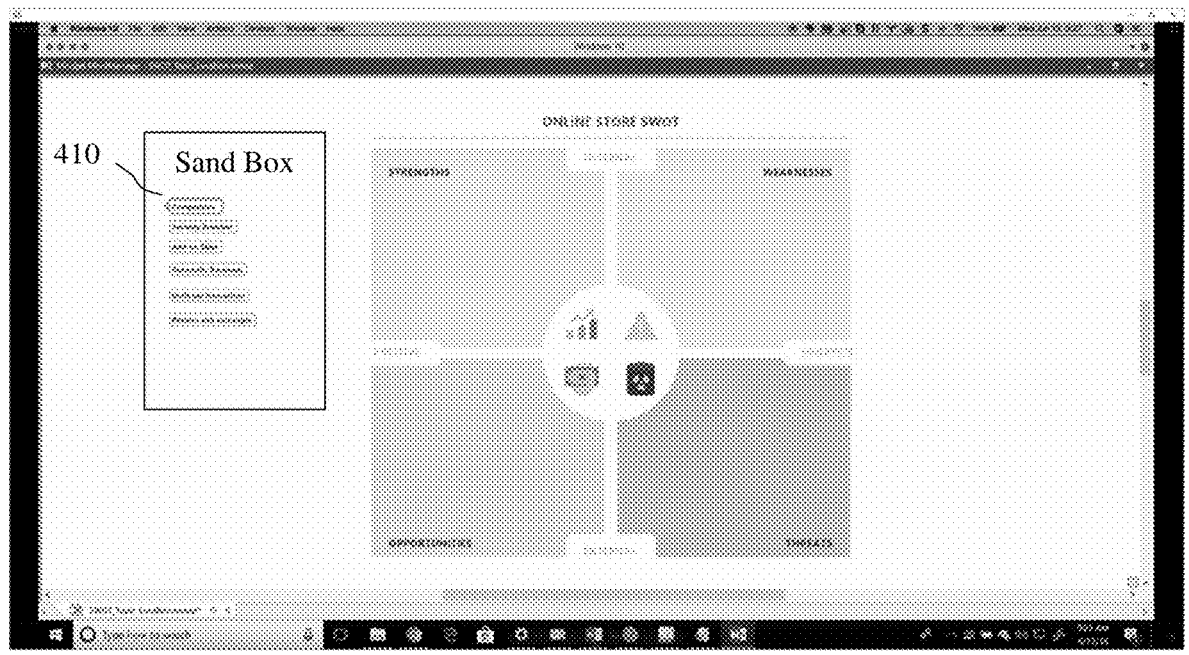
Figure 5:
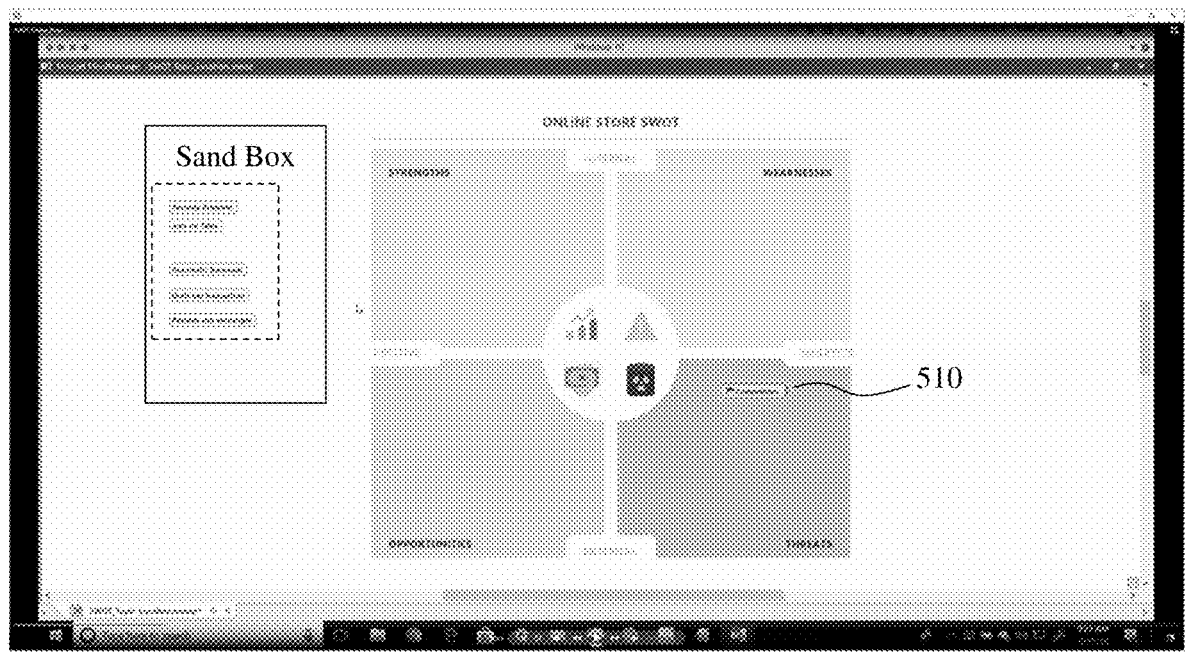
Figure 6:
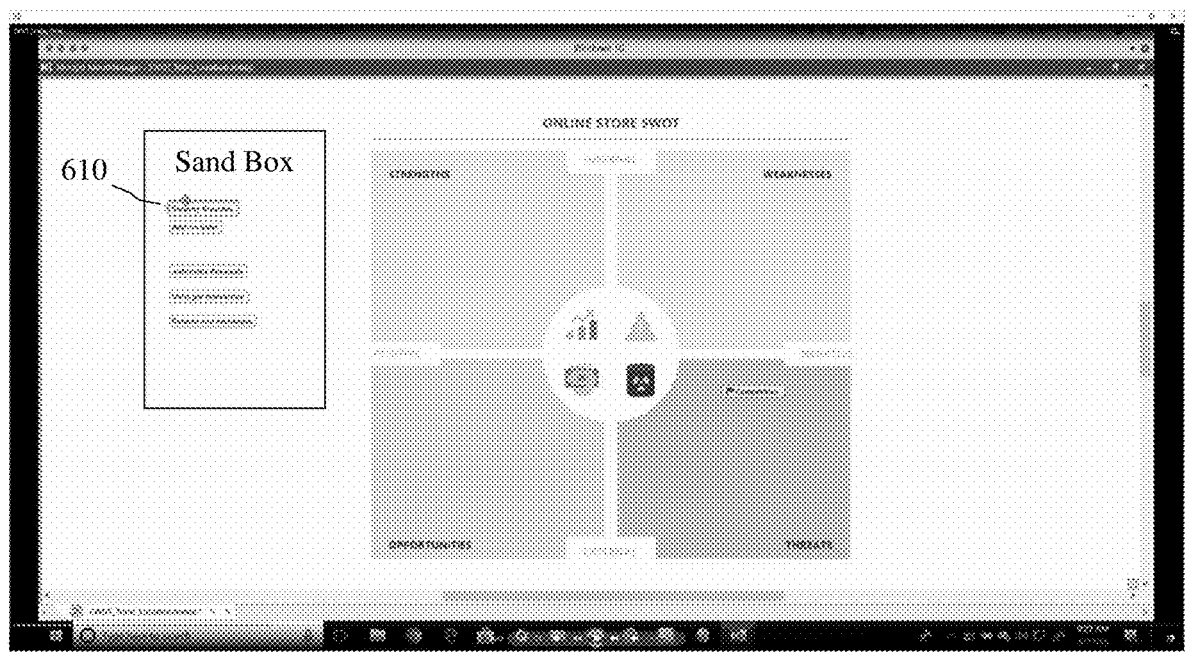
Figure 7:
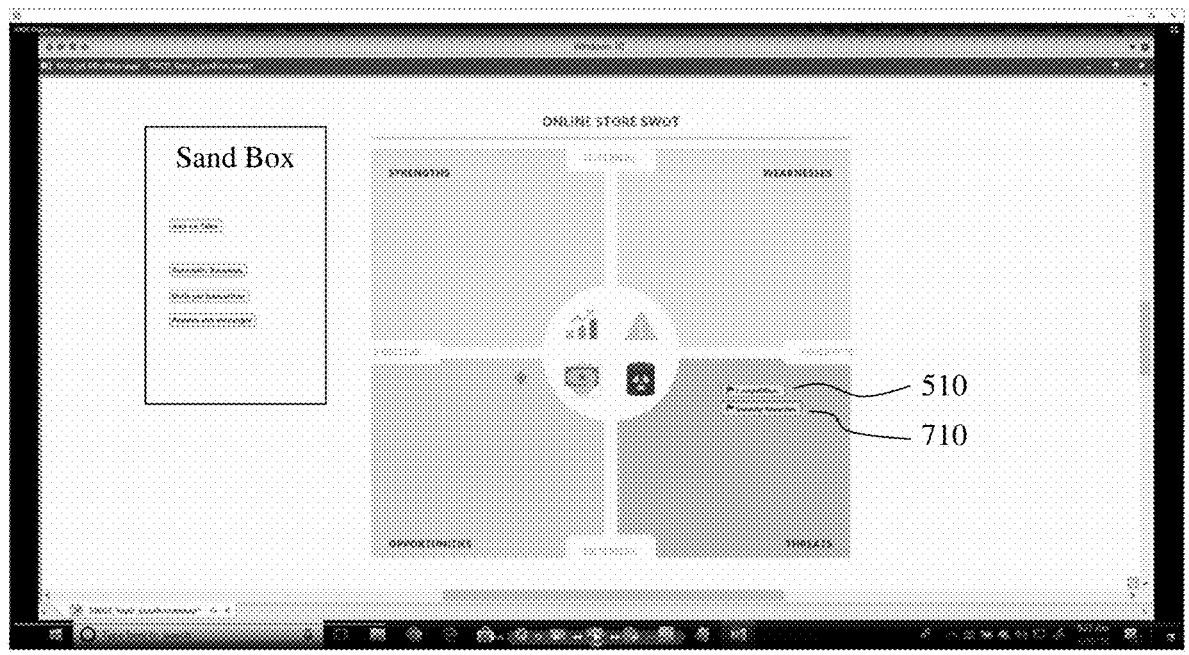
Figure 8:
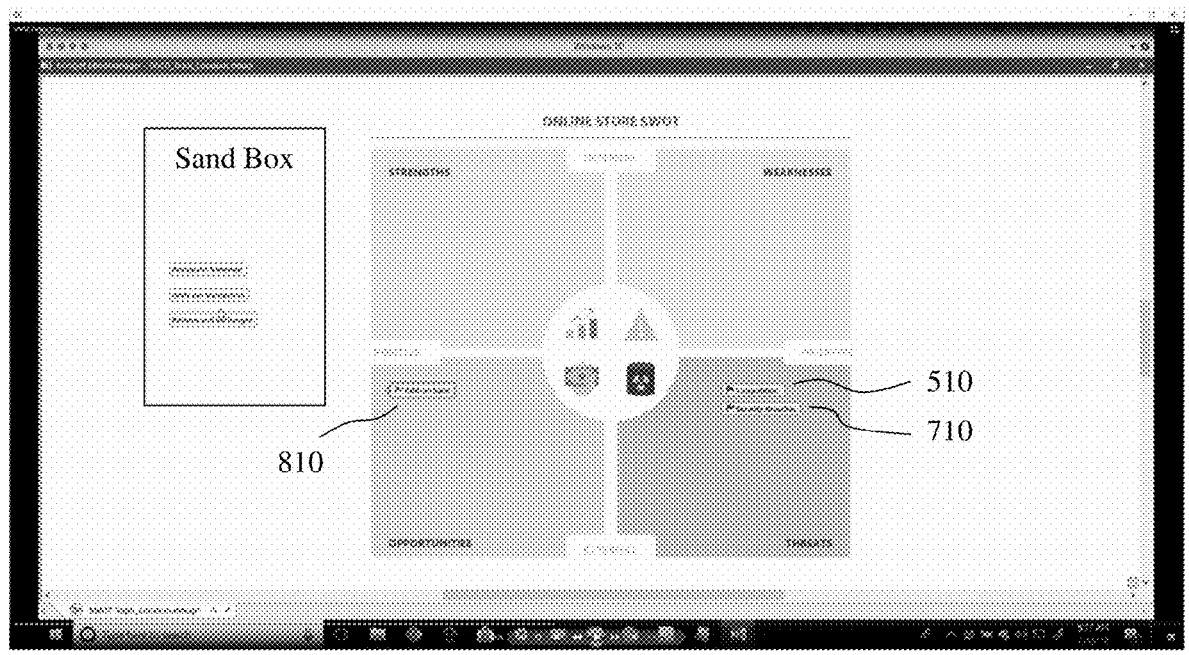
Figure 9:
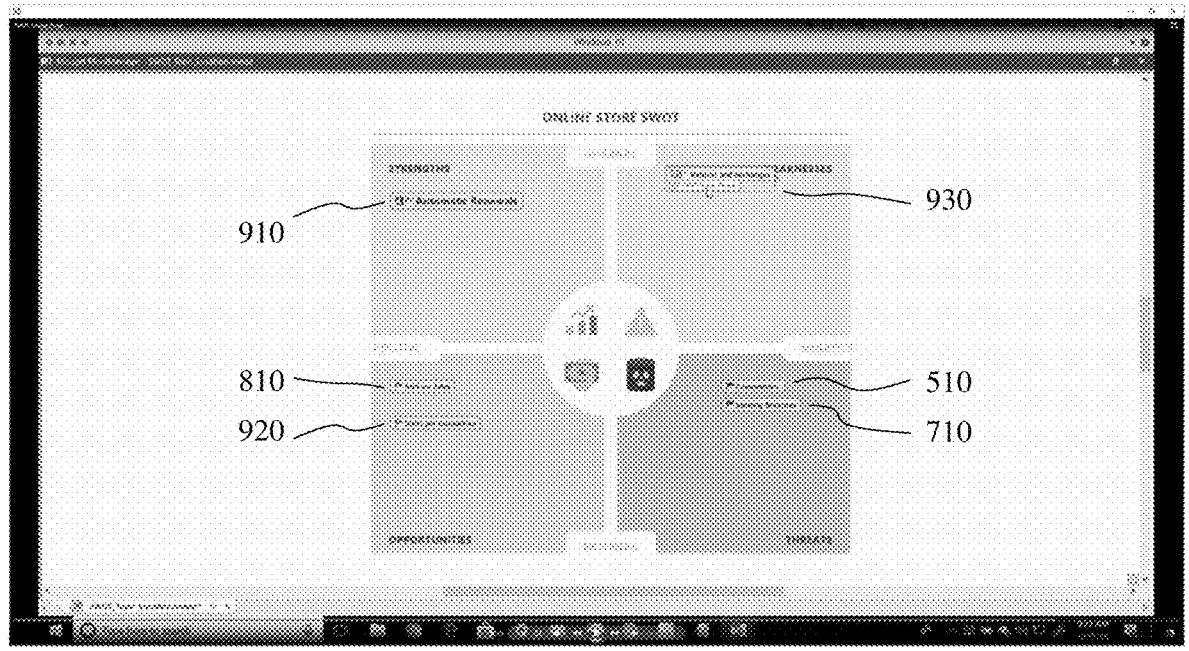
Figure 10:
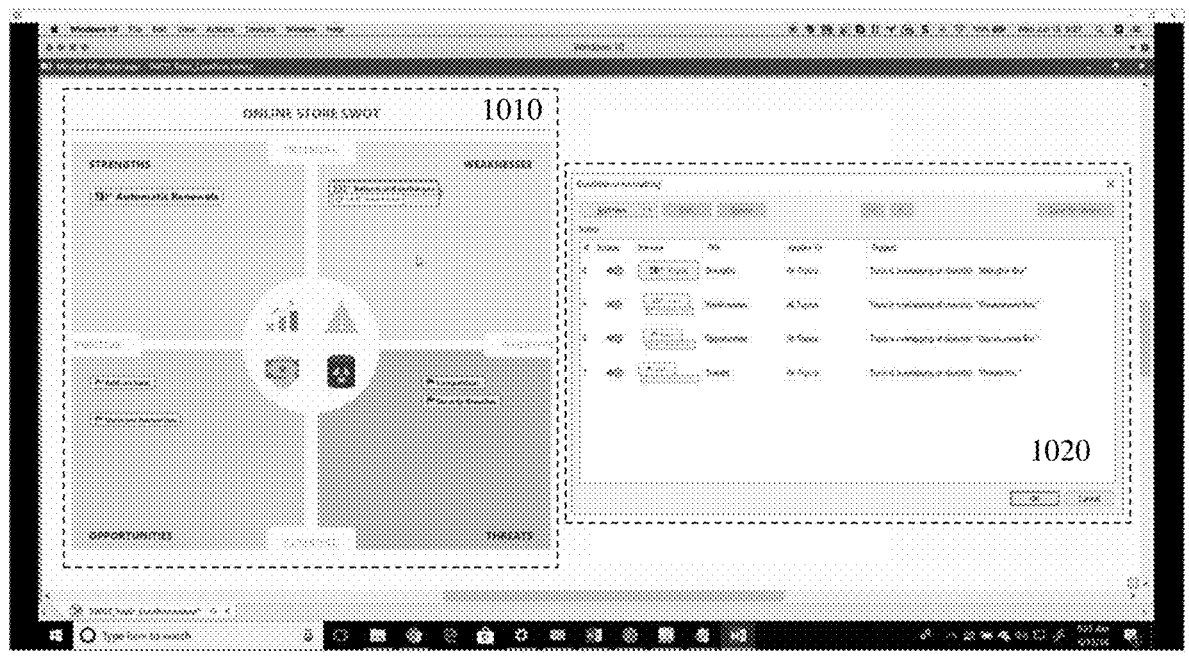

Within FIGS. 4 to 9 the following sequence of activities are performed:
  FIG. 4 depicts selection of a first item of content "Competition" 410 within the sandbox;
  FIG. 5 depicts the result of the user dragging and dropping "Competition" onto the SWOT template into the "Threats" portion wherein the applicable rule(s) are applied resulting in first entry 510;
  FIG. 6 depicts selection of a second item of content "Security Breaches" 610 within the sandbox;
  FIG. 7 depicts the result of the user dragging and dropping "Security Breaches" onto the SWOT template into the "Threats" portion wherein the applicable rule(s) are applied resulting in second entry 710;
  FIG. 8 depicts the result of the user dragging and dropping "Add-on Sales" onto the SWOT template into the "Opportunities" portion from the sand box wherein the applicable rule(s) are applied resulting in third entry 810;
  FIG. 9 the result of the user dragging and dropping "Automatic Renewals" into the "Strengths" portion, "Units per transaction" into the "Opportunities" portion, and "Returns and exchanges" into the "Weaknesses" portion of the SWOT template wherein the applicable rules are applied resulting in fourth to sixth entries 910 to 930 respectively.

A CESCEAP according to an embodiment of the invention may automatically apply the rule(s) applicable for a portion of the template onto which the content is inserted or it may alternatively provide the user with an option to accept or reject the automatic formatting which may be in conjunction with or without depicting a preview. Subsequently, a user may select to edit a rule or rules wherein they are presented with the current view of the template with content in first window 1010 and rule editor 1020. The rule editor 1020 being for example first CFS-GUI 200 where the user selects the rule editor without selecting an item of content. If the user has selected an item of content prior to selecting to edit a rule, then the rule editor 1020 may only present the rule for that portion of the template within which the item of content is displayed.

Figure 11:
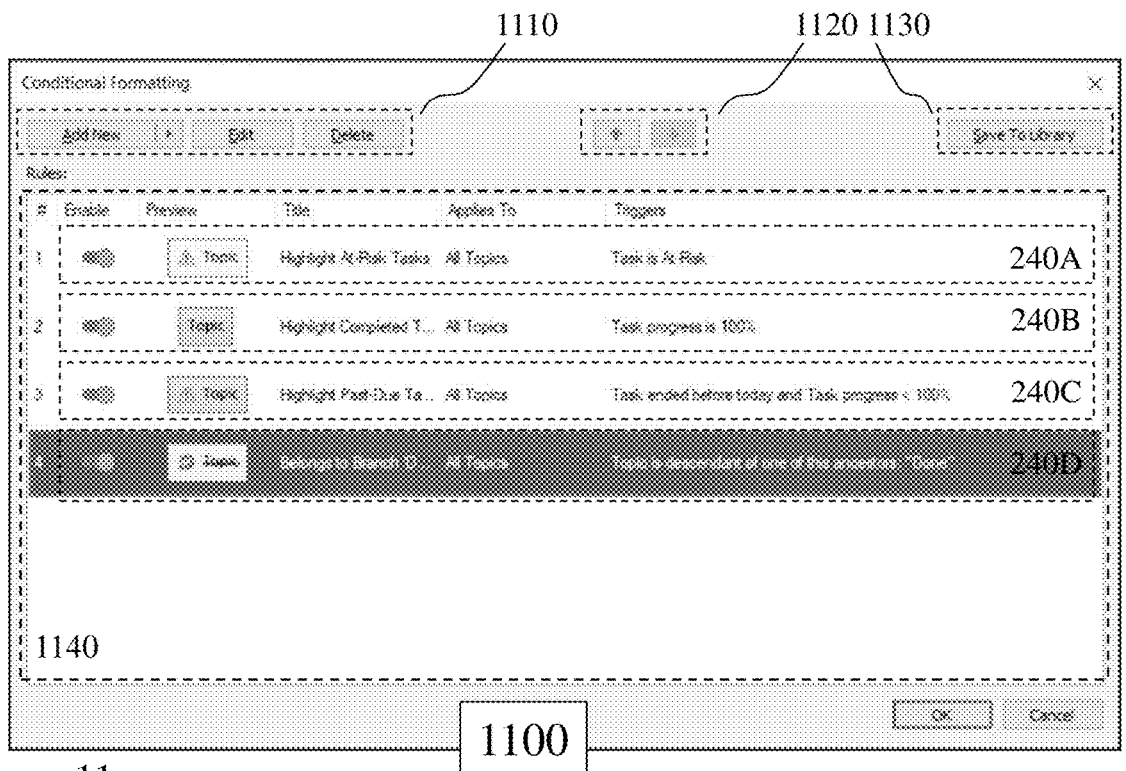
FIG. 11 depicts a conditional format setting interface for a content template within a CESCEAP according to embodiments of the invention.

Now referring to FIG. 11 there is depicted a conditional format setting GUI (CFS-GUI) for a content template within a content editing system and content editing application/platform (CESCEAP) according to embodiments of the invention. Whilst FIGS. 2A to 10 relates to a SWOT analysis template in order to depict an embodiment of the invention wherein the format of content was automatically established based upon where the user placed the content within the template. In contrast FIGS. 11 to 19 relate to a project "PhoDrone" and a Kanban based card type tracking system for the project depicted in a format common to an organizational hierarchy template ("organization chart" or "org chart"). However, rather than the format of the content being defined based upon the location of the content within the template the format is established in dependence upon data associated with the content. Accordingly, the content for the project "PhoDrone" depicted and described with respect to FIGS. 11 to 19 may be accessed from a database wherein data relating to the percentage completed of tasks and data relating to classification of the tasks are employed.

Accordingly, first CFS-GUI 1100 comprises first to third action user interfaces (ACT-UIs) 1110 to 1130 respectively and rule display 1140 comprising first to fourth rules 1140A to 1140D respectively. Accordingly, first ACT-UI 1110 provides the user with the ability to add a new conditional formatting rule (CF-RULE) or if they have previously selected a displayed rule within the rule display 1140 to edit it or delete it. Second ACT-UI 1120 allows the user to navigate within the rule display 1140 where the number of rules exceeds that which can be depicted in the rule display 1140. Third ACT-UI 1130 allows the user to save the rule to a library such that, for example, a rule generated within one document generated by a user within a CESCEAP may, for example, be accessed within another document within the same CESCEAP, accessed within another document within another CESCEAP, or be accessed by another user within another electronic document within either the same CESCEAP or another CESCEAP. Optionally, the CFS-GUI 1100A may include additional ACT-UIs or variants of the first to third ACT-UIs depicted such that, for example, a user can access a rule within a library that they generated, access a rule established within a library by an organization and/or enterprise they are associated with, access a rule within a library where the rule was generated by another user, enterprise, organization etc., access a rule from a webpage and/or website, access a rule from a document accessed by a Uniform Resource Locator (URL) etc. where the URL was posted within a web page, web site, a SOCNET or a SOME for example.

Accordingly, within rule display 1140 there are depicted first to fourth rules 1140A to 1140D which relate to the formatting of an item of content within the Kanban based card type tracking system for the project depicted in a format common to an organizational hierarchy template, such as depicted within FIGS. 13 to 19 respectively as described below. As depicted, each of the first to fourth rules 1140A to 1140D comprises several sections identified as "Enable", "Preview", "Title", "Applies To", and "Triggers." These may represent all sections or just some of the sections applicable within different embodiments of the invention. As depicted, these relate to:
  "Enable" wherein the user can toggle the selector to enable or disable the rule;
  "Preview" wherein the user is presented with a visual representation of how the rule will apply the conditional formatting;
  "Title" wherein the section of the content template the rule relates to is indicated, in this instance, one of the "Highlight at Risk Tasks", "Highlight Completed Tasks", "Highlight Past Due Tasks", and "Belongs to Branch "Done"";
  "Applies To" wherein any sub-rules relating to what content the rule applies to is indicated wherein this is indicated as "All Topics" but may be alternatively selectively applied to only text, only numeric content, only a hypertext, a subset of content forms, etc.; and "Triggers" wherein a trigger or triggers for the application of the rule is presented wherein some rules may have a single simple rule such as those indicated, namely the rule is applied simply these may be more complex rules such that conflicts may be addressed.

Accordingly, each of first to fourth rules 1140A to 1140D is associated with a single trigger associated with content retrieved in association with a task. Accordingly, the triggers are defined as "Task is At-Risk", "Task progress is 100%", "Task Ended Before Today and Task Progress<100%" and "Topic is Descendent of One of This Ancestors: "Done"." Accordingly, data retrieved from a database together with the tasks may be processed to establish whether a trigger is triggered. For example, a project management database for "PhoDrone" may list tasks within the project, a prime individual for each task, a status percentage for each task, a status identifier for each task (e.g. pending, active, done, closed, etc.), and a due date. Accordingly, the status percentage and status identifier may be employed for the first to fourth rules 1140A to 1140D respectively. However, as will become evident in respect of FIGS. 13 to 19 a user's actions with respect to the Kanban based card type tracking system once rendered and displayed may be reflected back to the database storing the data for the project.

Accordingly, the following conditions may result in each of the triggers for first to fourth rules 1140A to 1140D respectively.

First rule 1140A with trigger "Task Is at Risk" is triggered when the slide is opened, the current status percentage is less than 100% and the remaining time between time of opening to due date is within a predetermined threshold, e.g. task is at 50%, projected completion is 20% per week and there are three weeks to due date. Accordingly, any reduction in rate of completion impacts the task being completed.

Second rule 1140B with "Task Progress is 100%" is triggered when the status percentage is 100% and status is pending or active for example.

Third rule 1140C with "Task Ended Before Today and Task Progress<100%" is triggered when the status percentage is less than 100% and the status is done.

Fourth rule 1140D with "Topic is Descendent of One of This Ancestors: "Done"" is triggered when the status of an antecedent task is done for example.

Within FIG. 11 the first CFS-GUI 1100 includes language "Belongs to Branch" wherein in addition to the rule establishing how a task is displayed within the Kanban based card type tracking system for the project depicted in a format common to an organizational hierarchy template the rule also defines where in the resulting display the task will be displayed. Accordingly, any task triggering this trigger is displayed within a branch of the displayed Kanban based card hierarchy entitled "Done" rather than within the branch it related to prior be its status changing to "Done." Accordingly, a card within either "Backlog", "Design", "Engineering", "OA" is moved automatically to "Done" the next time the slide is accessed and the CESCEAP retrieves the data from the database irrespective of where it was previously.

Figure 12:
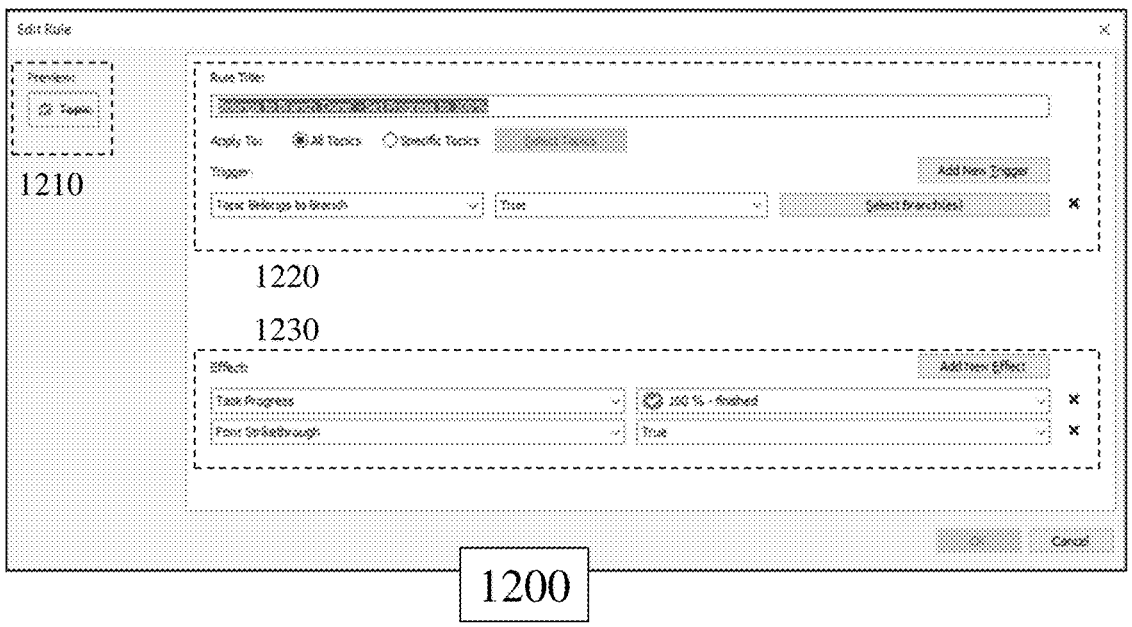
FIG. 12 depicts a rule editing interface for a content template within a CESCEAP according to an embodiment of the invention.

Now referring to FIG. 12 there is depicted a second CFS-GUI 1200 with respect to the Kanban based card type tracking system wherein a user has previously selected a rule within rule display 1140 in FIG. 11 and then selected to edit the rule via first ACT-UI 1110 in FIG. 11. Accordingly, in this instance the user has selected fourth rule 1140A and the second CFS-GUI 1200 depicts a preview 1210 of the rule, which is the same as that in the preview portion of the first rule 1140A in rule display 1140 in FIG. 11. Also depicted are first and second formatting windows 1220 and 1230. Within first formatting window 1220 as depicted the user can set a title for the rule, "Belongs to Branch "Done""—Set Progress to 100%", define to what the rule applies (e.g. "All Topics" or "Specific Topics" as indicated wherein if "Specific Topics" is enabled the user can select them), and define the triggers that apply as well as establish a new trigger if appropriate. Within second formatting window 1230 the user can establish the visual formatting of the content displayed using the rule. As indicated the window presents the current effect(s), any priority indicators etc., any fill colour to a text box etc., and allow the user to add a new effect.

Within embodiments of the invention the selection of "Add New Trigger" may provide a default option to the user allowing them to build the trigger themselves or they may be provided with a list of previously established triggers for the template generally or for templates having keywords within the rule title that match those for the rule the user is adding the trigger to. Accordingly, the user may be presented, for example in this example of "Strengths" with triggers established by the user previously, triggers established by other users accessible from one or more libraries, etc.

Within embodiments of the invention the selection of "Add New Effect" may provide a default option to the user allowing them to build the effect themselves or they may be provided with a list of previously established effects for the template generally or for templates having keywords within the rule title that match those for the rule the user is adding the effect to. Accordingly, the user may be presented, for example in this example of "Strengths" with effects established by the user previously, effects established by other users accessible from one or more libraries, etc.

Figure 13:
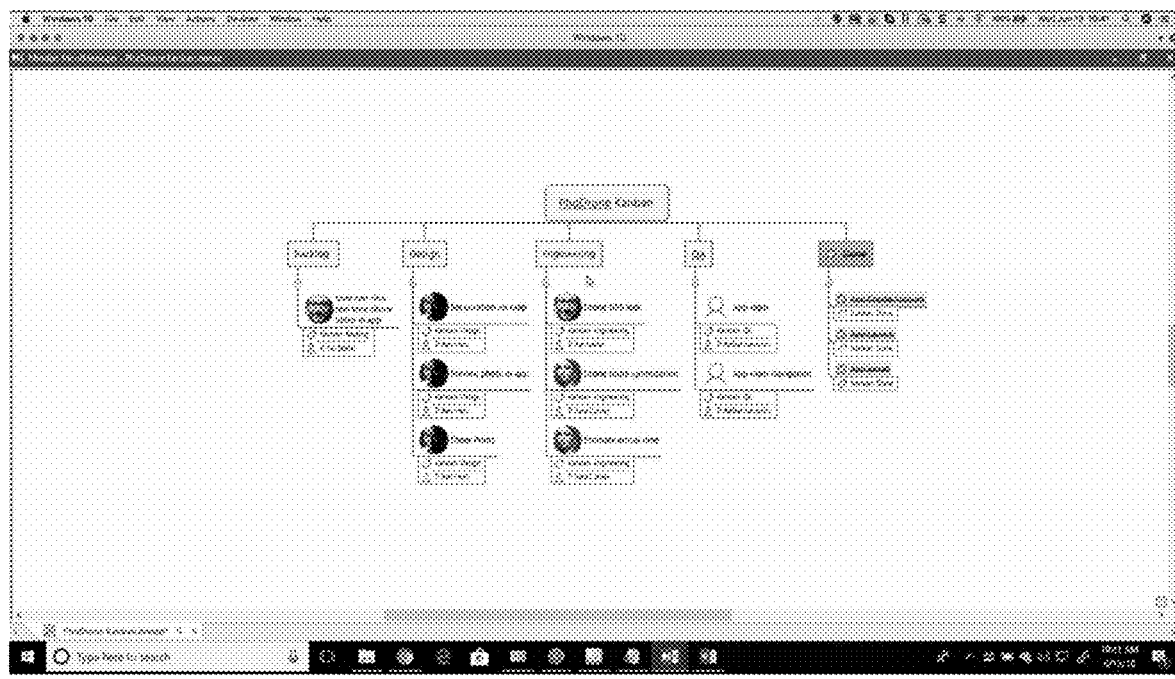
FIGS. 13 to 19 depict exemplary screenshots of a slide automatically generated through acquisition of data from database by a CESCEAP according to an embodiment of the invention.
Figure 14:
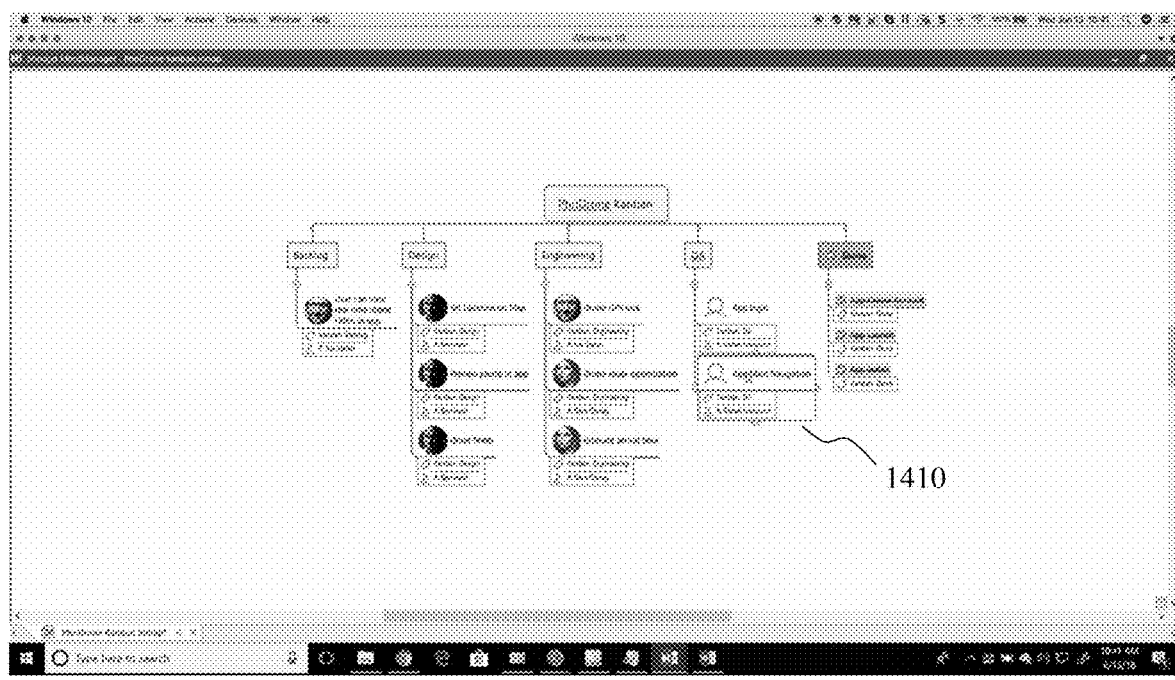
Figure 15:
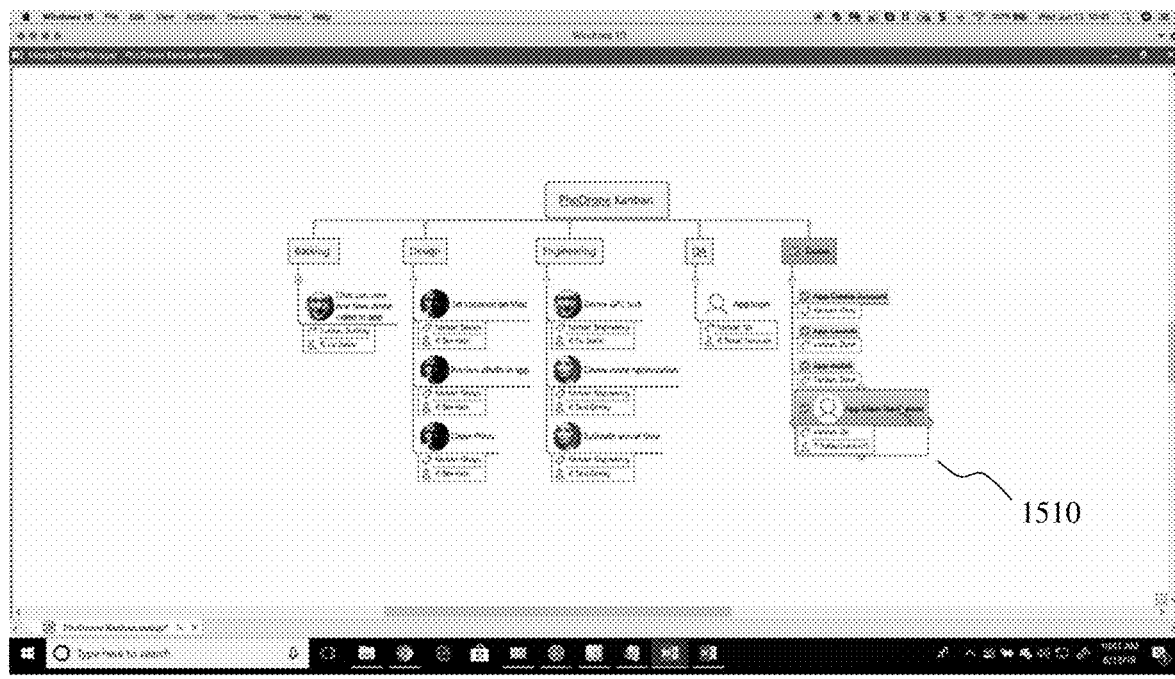
Figure 16:
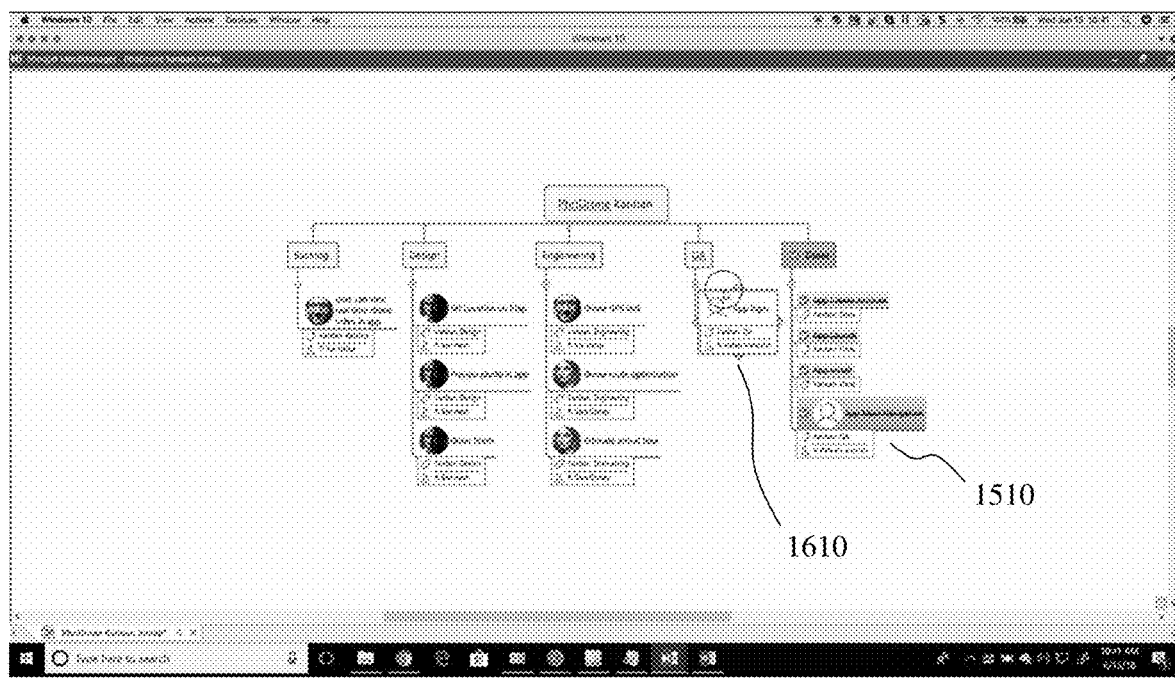
Figure 17:
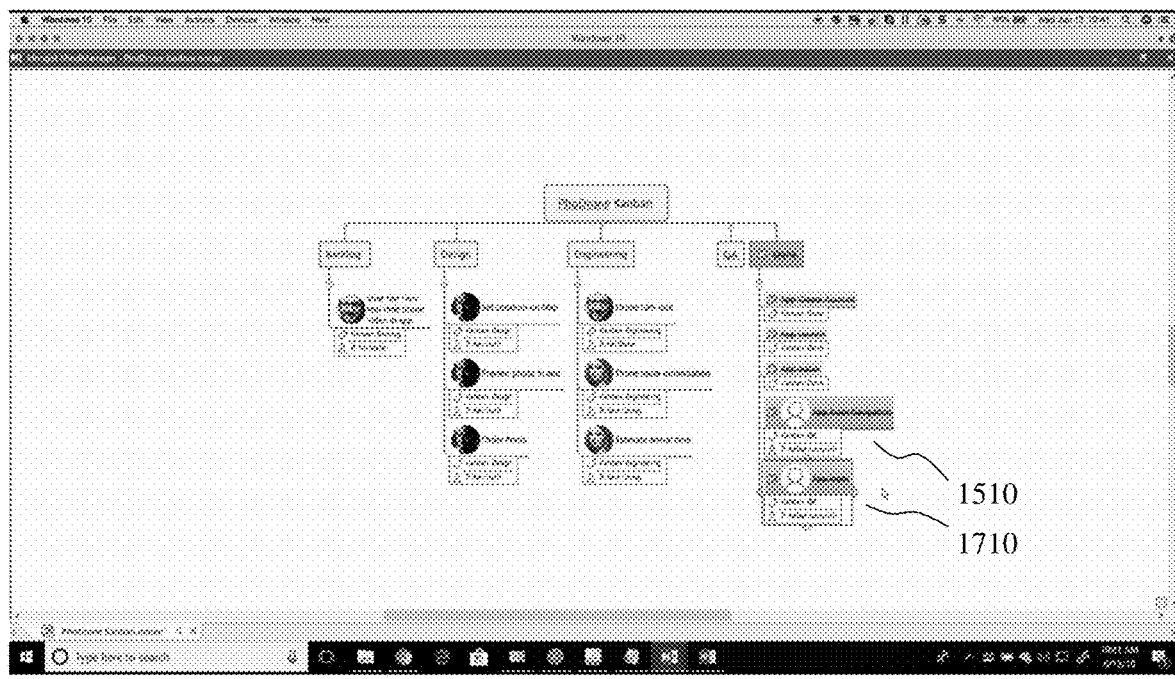
Figure 18:
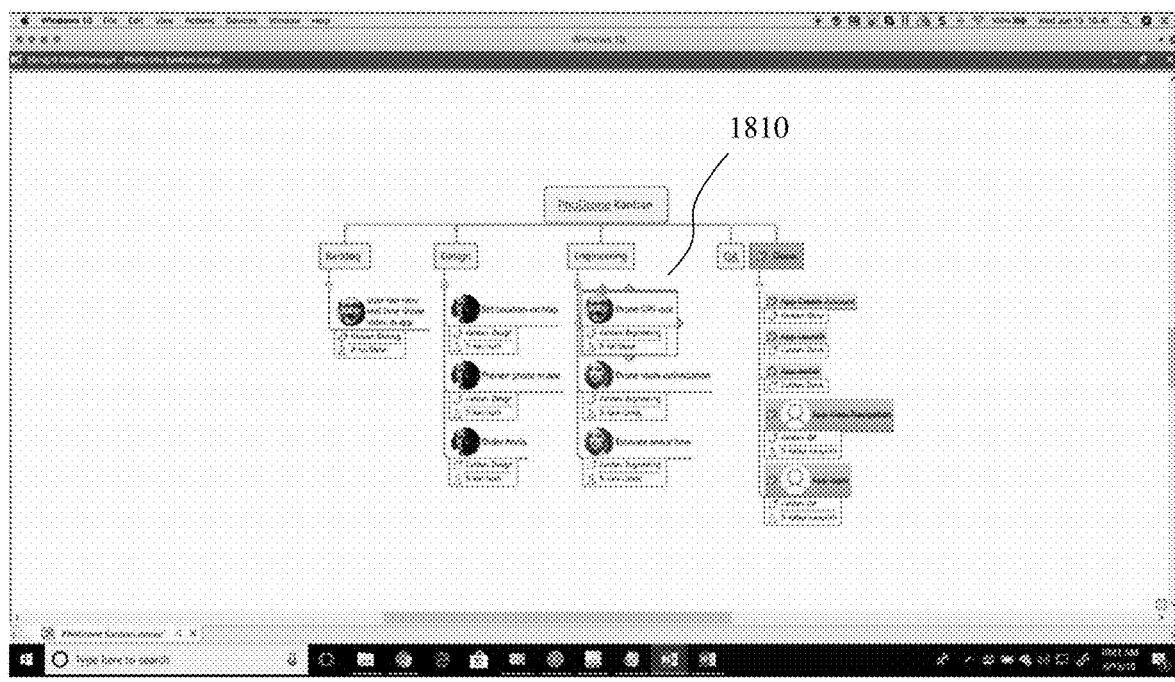
Figure 19:
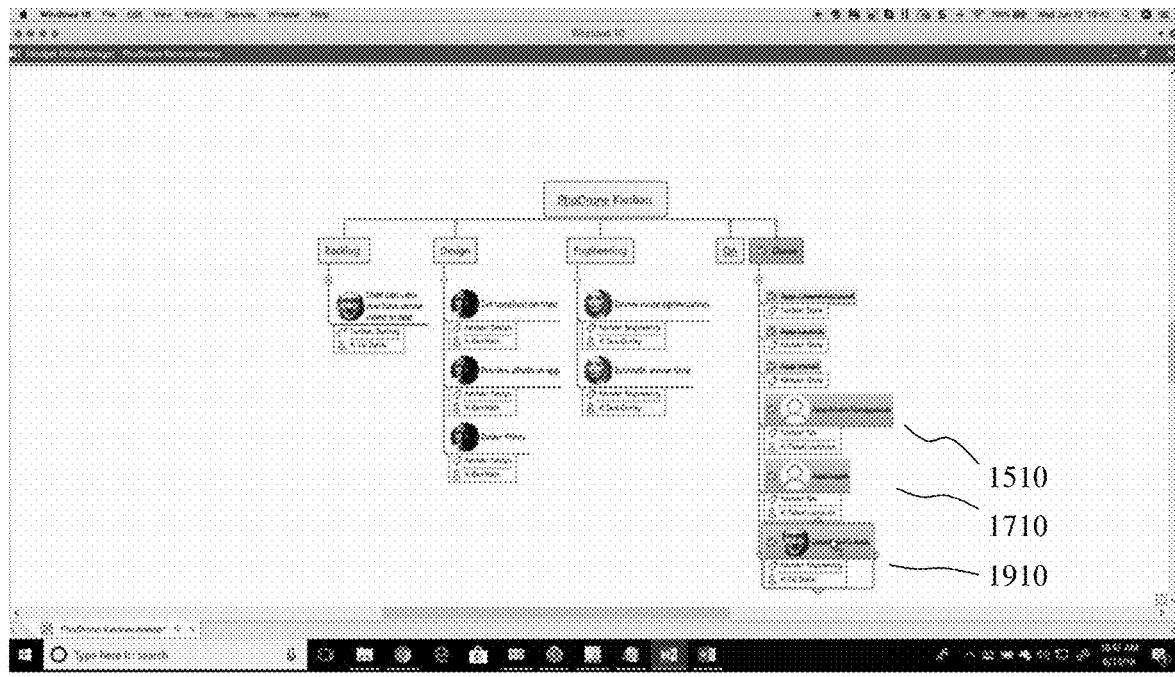

FIGS. 13 to 19 depict exemplary screenshots of a slide automatically generated through acquisition of data from database by a CESCEAP according to an embodiment of the invention. Within FIGS. 13 to 19 the following sequence of activities are performed:

FIG. 13 depicts the Kanban based card type tracking system as displayed based upon the CECEAP accessing a database relating the project, "PhoDrone", wherein cards are associated with the branches "Backlog", "Design", "Engineering", "OA", and "Done" based upon the data for each card within the database and the rules;

FIG. 14 wherein a user has selected a first card 1410 within the display, namely "App-Main Navigation" from the branch "OA";

FIG. 15 wherein the user has dragged the first card 1410 onto the branch wherein the card is now displayed as second card 1510 within the branch and with the format of this branch;

FIG. 16 wherein a user has selected a third card 1610 within the display, namely "App login" from the branch "OA";

FIG. 17 wherein the user has dragged the third card 1610 onto the branch wherein the card is now displayed as fourth card 1710 within the branch and with the format of this branch;

FIG. 18 wherein a user has selected a fifth card 1810 within the display, namely "Drone GPS Lock" from the branch "Engineering"; and FIG. 19 wherein the user has dragged the fifth card 1810 onto the branch wherein the card is now displayed as sixth card 1910 within the branch and with the format of this branch.

Accordingly, whereas in FIGS. 3 to 10 a user could drag and drop an item onto the template and no other actions were discussed then FIGS. 13 to 19 depict the scenario wherein subsequent user actions with respect to items with an item within a slide rendered and managed by a CESCEAP according to an embodiment of the invention are handled in a similar manner by applying the rules to their new position. Accordingly, as depicted within FIGS. 13 to 19 a user can drag an item from one portion of a rendered GUI, e.g. first card 1410, to which a first set of rules are applied and drop the item within another portion of the rendered GUI such that the rules of the new location are applied. Accordingly, referring back to FIGS. 3 to 10 respectively, if having placed "Competition" within "Threats" decided to move it to "Opportunities" then the rules for "Opportunities" would be applied rather than "Threats." Optionally, where an item is initially formatted according to its position within the slide then the user may be given the option to not have the format modify to the new position either through another rule or by a prompt to the user.

Within the preceding descriptions in respect of FIGS. 2A to 20 the descriptions have been described with respect to a slide within a CESCEAP such as a presentation tool for example such as PowerPoint, Prezzi etc. However, it would be evident that the embodiments of the invention may be applied to a wide variety of CESCEAPs including, but not limited to, office productivity tools, word processors, spreadsheets, presentation software, business software, computer aided design, database tools, decision making software, educational software, simulation software, mathematical software, industrial automation software, medical software, graphics editing software, video editing software, audiovisual editing software, audiovisual playback software, web browser software, web pages, web sites, gaming software, programming tools, graphing software, content management software, antivirus software, concept software, mind-mapping software, etc. Accordingly, a CESCEAP according to an embodiment of the invention may render content to a user in a variety of formats commensurate with each software tool or software application.

Within the preceding descriptions in respect of FIGS. 2A to 20 the descriptions have been described with respect to text based content within a CESCEAP. However, within other embodiments of the invention the application of one or more rules and/or one or more triggers may be applied to other forms of content (electronic content).

A CESCEAP according to embodiments of the invention associates one or more rules and/or one or more triggers with respect to a format for rendering content to a user within rendered content based upon the location (position) of the content relative to the rendered content.

A CESCEAP according to embodiments of the invention associates one or more rules and/or one or more triggers with respect to a format for rendering content to a user within rendered content based upon the location (position) of the content relative to the rendered content and data within a database associated with the content defining one or more aspects with respect to the content.

A CESCEAP according to embodiments of the invention associates one or more rules and/or one or more triggers with respect to a format for rendering content to a user within rendered content based upon data within a database associated with the content defining one or more aspects with respect to the content.

A CESCEAP according to embodiments of the invention associates one or more rules and/or one or more triggers with respect to a format for rendering content to a user within rendered content based upon the location (position) of the content relative to the rendered content and data within a database associated with the content defining one or more aspects with respect to the content and updates the data within the database in dependence upon subsequent user actions with respect to location (position) of the content within the rendered content.

A CESCEAP according to embodiments of the invention may associate one or more rules and/or one or more triggers with respect to a format for rendering content to a user within rendered content based upon the user entering the content into the location directly; copying-and-pasting the content into the location from another CESCEAP, software application, web page, etc.; and dragging and dropping the content into the location.

A CESCEAP according to embodiments of the invention may employ one or more rules and/or one or more triggers with respect to content based upon data associated with the content defining one or more aspects with respect to the content and/or data associated with a user at least one of adding the content and viewing the content.

A CESCEAP according to embodiments of the invention may associate one or more rules and/or one or more triggers with respect to rendering content may access one or more external sources to acquire additional content to render including, but not limited to, additional content acquired from the CESCEAP itself, another CESCEAP, another software application, a database, an online resource, a website, a webpage, a PED, a FED, a wearable device, a SOCNET or SOCNETS, a SOME or SOMEs, a third party associated with the content, a service provider associated with the content, and data relating to one or more other users associated with the content and acquired from at least one of one or more PEDs associated with the one or more other users, one or more FEDs associated with the one or more other users, one or more wearable devices associated with the one or more other users, and one or more SOCNETs and/or SOMEs associated with the one or more other users.

A CESCEAP according to embodiments of the invention associates one or more rules and/or one or more triggers with respect to a format for rendering content to a user. Whilst within the preceding descriptions in respect of FIGS. 2A to 20 the trigger(s) described have been simple it would be evident that the triggers may be more complex, conditional upon other aspects of the content and/or data, modified as an item of rendered content (e.g. a slide within a pre sentation) is copied and/or merged into another item of rendered content (e.g. a slide from one slide deck is merged into another slide deck), conditional modified as the item of rendered content is copied and/or merged into another item of rendered content (e.g. based upon the user merging allowing modification or preventing it such that the original rules and/or triggers etc. are applied rather than the rules and/or triggers of the content it is merged into are applied.

A CESCEAP according to embodiments of the invention associates one or more rules and/or one or more triggers with respect to a format for rendering content to a user. Accordingly, this format, once established may be stored in association with the content such that subsequently the content may be rendered within a software application with the format established without requiring the content to be converted into a printed format (e.g. a portable document format) and/or stored in an executable form (e.g. HTML). In this manner the format once established can be ported within a variety of documents maintaining the initial format.

A CESCEAP according to embodiments of the invention associates one or more rules and/or one or more triggers with respect to a format for rendering content to a user. Accordingly, these one or more rules and/or one or more triggers, once established may be stored in association with the content such that subsequently the content may be rendered within a software application with the format established by the one or more rules and/or one or more triggers at that point in time without requiring the software application or software system generating the content in rendered form again support all of the features of a CESCEAP according to embodiments of the invention.

A CESCEAP according to embodiments of the invention may as described above in respect of FIGS. 2A to 20 employ associations such as "branch" within a hierarchy (e.g. "Belongs to Branch") or location (e.g. "Topic Location" where a topic is an item of content added to a template such as a SWOT analysis, organization chart, etc.).

Within embodiments of the invention aspects to which one or more triggers may be applied may include, but not be limited to, the following in respect of a project management CESCEAP, a mind-mapping CESCEAP etc.:

Task At-risk;
Part of Task Info Roll-up Branch;
Topic Text;
Progress;
Priority;
Icons & Tag Values;
Property Values;
Assigned Resources;
Task Start & Due Dates;
Task Duration;
Task Effort;
Task Milestones;
Number of Attachments;
Number of Links; and
Number of Subtopics.

Within embodiments of the invention aspects to which one or more rules may be applied after one or more triggers have been met may include, but not be limited to, the following:

Add topic properties (e.g. text fields, pick lists, currency fields, numeric fields, etc. . . . )
Assign Task Resources;
Assign Tags;
Assign Task Priority;
Assign Task Progress;
Assign Topic Styles;
Apply Fill Color;
Apply Line Color;
Change Topic Shape;
Apply New Font Size;
Apply Font Italic;
Apply Font Bold;
Apply Font Underline;
Apply Font Strike Through;
Apply New Font Color;
Add Icon; and
Format Icon.

A CESCEAP according to embodiments of the invention associates one or more rules and/or one or more triggers with respect to the addition of text based content, the addition of image based content, the addition of audiovisual content, the addition of linked content (e.g. linked via a URL), etc. For example, one or more rules which may be applied after one or more triggers have been met may include, but not be limited to, the following:

Source Format of the Audiovisual Content;
Dimensions of the Audiovisual Content;
Organization and/or Enterprise Associated with Sourced Content;
Identity of the User Adding the Content; and
Identity of an Organization and/or Enterprise Associated with Adding the Content.

A CESCEAP according to embodiments of the invention associates one or more rules and/or one or more triggers which may be automatically applied, or they may be applied subject to a "Manual Override" allowing a rule, effect, trigger to be created, employed, and overridden with respect to the applied metadata, formatting etc.

A CESCEAP according to embodiments of the invention associates one or more rules and/or one or more triggers with a template which may be stored solely within the template or they may be associated with a library, a database, etc. allowing them to be applied to new templates etc.

Specific details are given in the above description to provide a thorough understanding of the embodiments. However, it is understood that the embodiments may be practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

Implementation of the techniques, blocks, steps and means described above may be done in various ways. For example, these techniques, blocks, steps and means may be implemented in hardware, software, or a combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described above and/or a combination thereof.

Also, it is noted that the embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be rearranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Furthermore, embodiments may be implemented by hardware, software, scripting languages, firmware, middleware, microcode, hardware description languages and/or any combination thereof. When implemented in software, firmware, middleware, scripting language and/or microcode, the program code or code segments to perform the necessary tasks may be stored in a machine readable medium, such as a storage medium. A code segment or machine-executable instruction may represent a procedure, a function, a subprogram, a program, a routine, a subroutine, a module, a software package, a script, a class, or any combination of instructions, data structures and/or program statements. A code segment may be coupled to another code segment or a hardware circuit by passing and/or receiving information, data, arguments, parameters and/or memory content. Information, arguments, parameters, data, etc. may be passed, forwarded, or transmitted via any suitable means including memory sharing, message passing, token passing, network transmission, etc.

For a firmware and/or software implementation, the methodologies may be implemented with modules (e.g., procedures, functions, and so on) that perform the functions described herein. Any machine-readable medium tangibly embodying instructions may be used in implementing the methodologies described herein. For example, software codes may be stored in a memory. Memory may be implemented within the processor or external to the processor and may vary in implementation where the memory is employed in storing software codes for subsequent execution to that when the memory is employed in executing the software codes. As used herein the term "memory" refers to any type of long term, short term, volatile, nonvolatile, or other storage medium and is not to be limited to any particular type of memory or number of memories, or type of media upon which memory is stored.

Moreover, as disclosed herein, the term "storage medium" may represent one or more devices for storing data, including read only memory (ROM), random access memory (RAM), magnetic RAM, core memory, magnetic disk storage mediums, optical storage mediums, flash memory devices and/or other machine readable mediums for storing information. The term "machine-readable medium" includes, but is not limited to portable or fixed storage devices, optical storage devices, wireless channels and/or various other mediums capable of storing, containing or carrying instruction(s) and/or data.

The methodologies described herein are, in one or more embodiments, performable by a machine which includes one or more processors that accept code segments containing instructions. For any of the methods described herein, when the instructions are executed by the machine, the machine performs the method. Any machine capable of executing a set of instructions (sequential or otherwise) that specify actions to be taken by that machine are included. Thus, a typical machine may be exemplified by a typical processing system that includes one or more processors. Each processor may include one or more of a CPU, a graphics-processing unit, and a programmable DSP unit. The processing system further may include a memory subsystem including main RAM and/or a static RAM, and/or ROM. A bus subsystem may be included for communicating between the components. If the processing system requires a display, such a display may be included, e.g., a liquid crystal display (LCD). If manual data entry is required, the processing system also includes an input device such as one or more of an alphanumeric input unit such as a keyboard, a pointing control device such as a mouse, and so forth.

The memory includes machine-readable code segments (e.g. software or software code) including instructions for performing, when executed by the processing system, one of more of the methods described herein. The software may reside entirely in the memory, or may also reside, completely or at least partially, within the RAM and/or within the processor during execution thereof by the computer system. Thus, the memory and the processor also constitute a system comprising machine-readable code.

In alternative embodiments, the machine operates as a standalone device or may be connected, e.g., networked to other machines, in a networked deployment, the machine may operate in the capacity of a server or a client machine in server-client network environment, or as a peer machine in a peer-to-peer or distributed network environment. The machine may be, for example, a computer, a server, a cluster of servers, a cluster of computers, a web appliance, a distributed computing environment, a cloud computing environment, or any machine capable of executing a set of instructions (sequential or otherwise) that specify actions to be taken by that machine. The term "machine" may also be taken to include any collection of machines that individually or jointly execute a set (or multiple sets) of instructions to perform any one or more of the methodologies discussed herein.

The foregoing disclosure of the exemplary embodiments of the present invention has been presented for purposes of illustration and description. It is not intended to be exhaustive or to limit the invention to the precise forms disclosed. Many variations and modifications of the embodiments described herein will be apparent to one of ordinary skill in the art in light of the above disclosure. The scope of the invention is to be defined only by the claims appended hereto, and by their equivalents.

Further, in describing representative embodiments of the present invention, the specification may have presented the method and/or process of the present invention as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present invention should not be limited to the performance of their steps in the order written, and one skilled in the art can readily appreciate that the sequences may be varied and still remain within the spirit and scope of the present invention.

What is claimed is:

1. A template for use within a software application upon a computer system comprising:
   computer executable instructions stored upon a non-volatile non-transitory memory which when executed by a microprocessor of the computer system execute a process for automatically formatting an item of content being added to a graphical user interface (GUI) of the software application; wherein
   the process comprises:
      automatically establishing a trigger of the plurality of triggers to the item of content being added to the GUI in dependence upon an aspect of the item of content being added to the GUI; and
      automatically applying a rule of the plurality of rules to the item of content being added to the GUI; and
   the rule of the plurality of rules is established in dependence upon the trigger of the plurality of triggers that is triggered.

2. The template according to claim 1, wherein
   the plurality of triggers and the plurality of rules comprise a portion of data stored upon another non-volatile non-transitory memory;
   another portion of the data stored upon the another non-volatile non-transitory memory defines a first portion of the GUI as comprising a plurality of regions, each region of the plurality of regions having associated with it one or more triggers of a first subset of the plurality of triggers;
the aspect of the added item of content comprises a location within the first portion of the GUI of the added item of content and a type of the item of content; and
automatically applying a subset of a plurality of rules to the item of content comprises automatically formatting the added item of content according to the subset of the plurality of rules.

3. The template according to claim 1, wherein
the plurality of triggers and the plurality of rules comprise a portion of data stored upon another non-volatile non-transitory memory;
another portion of the data stored upon the another non-volatile non-transitory memory defines a first portion of the GUI as comprising a plurality of regions, each region of the plurality of regions having associated with it one or more triggers of a first subset of the plurality of triggers;
the aspect of the added item of content comprises a location within the first portion of the GUI of the added item of content; and
automatically applying a subset of a plurality of rules to the item of content comprises automatically formatting the added item of content according to the subset of the plurality of rules.

4. The template according to claim 1, wherein
a rule of the subset of rules comprises a primary rule and a secondary rule;
the primary rule is defined by the template and relates to the formatting of the added item of content; and
the secondary rule comprises further computer executable instructions which when executed by the microprocessor execute another process comprising the steps of:
  parsing the added item of content to detect one or more keywords; and
  acquiring from an external source a real-time captured element of content in dependence upon the detected of one or more keywords; and
the real-time captured element of content is added to the GUI as the item of content.

5. The template according to claim 1, wherein
a rule of the subset of rules comprises a primary rule and a secondary rule;
the primary rule is defined by the template and relates to the formatting of the added item of content; and
the secondary rule comprises further computer executable instructions which when executed by the microprocessor execute another process comprising the steps of:
  parsing the added item of content to detect one or more keywords; and
  acquiring from an external source a real-time captured element of content in dependence upon the detected of one or more keywords; and
the real-time captured element of content is added to the GUI in addition to the item of content.

6. A template according to claim 1, wherein
the plurality of rules comprises a first portion and a second portion;
the first portion of the plurality of rules are defaults relating to the template defined in dependence upon the software application;
the second portion of the plurality of rules are established with respect to the template by the user; and
each rule of the second portion of the plurality of rules is established by the user by one of:
  accessing the rule from a webpage or a website; and
  accessing the rule from a document accessed by a Uniform Resource Locator.

7. A template according to claim 1, wherein
the plurality of rules comprises a first portion and a second portion;
the first portion of the plurality of rules are defaults relating to the template defined in dependence upon the software application;
the second portion of the plurality of rules are established with respect to the template by the user; and
each rule of the second portion of the plurality of rules is established by the user by one of:
  accessing a library of rules established by the user;
  accessing a library of rules established by an organization or an enterprise associated with the user; and
  accessing a library of rules established by one or another user, an organization not associated with the user or an enterprise not associated with the user.

8. The template according to claim 1, wherein:
the aspect of the addition of the item of content is a location within a first portion of the GUI of the added item of content;
data stored upon another non-volatile non-transitory memory accessible to the microprocessor comprises data defining rendering guides within the first portion of the GUI which define a plurality of regions within the first portion of the GUI;
each region of the plurality of regions having associated with it one or more triggers of a first subset of the plurality of triggers where the first subset of the plurality of triggers relate to instances when the location within the first portion of the added item of content is entirely within a region of the plurality of regions;
a subset of the plurality of rules relate to addressing conflicts when the location within the first portion of the GUI of the added item of content overlaps two or more regions of the plurality of regions;
the rendering guides are at least one:
  only visible to the user as creator of an electronic document comprising the first portion of the GUI;
  disabled for a distributed version of an electronic document comprising the first portion of the GUI;
  not depicted within a printed version of at least one of the first portion of the GUI and an electronic document comprising the first portion of the GUI.

9. The template according to claim 1, wherein:
the aspect of the addition of the item of content is a location within a first portion of the GUI of the added item of content;
data stored upon another non-volatile non-transitory memory accessible to the microprocessor comprises data defining rendering guides within the first portion of the GUI which define a plurality of regions within the first portion of the GUI;
each region of the plurality of regions having associated with it one or more triggers of a first subset of the plurality of triggers where the first subset of the plurality of triggers relate to instances when the location within the first portion of the added item of content is entirely within a region of the plurality of regions;
the rendering guides are at least one:
  only visible to the user as creator of an electronic document comprising the first portion of the GUI;
  disabled for a distributed version of an electronic document comprising the first portion of the GUI;

not depicted within a printed version of at least one of the first portion of the GUI and an electronic document comprising the first portion of the GUI.

10. The template according to claim 1, wherein:
the rule of the plurality of rules defines the automatic application of an effect in association with adding the item of content; and
the effect is automatically adding an animation to the GUI.

11. The template according to claim 1, wherein:
the rule of the plurality of rules defines the automatic application of an effect in association with adding the item of content; and
the effect is automatically adding a bitmap image to the GUI.

12. The template according to claim 1, wherein:
the rule of the plurality of rules defines the automatic application of an effect in association with adding the item of content; and
the effect is automatically adding an automatically adding an item of audiovisual content to the GUI.

13. The template according to claim 1, wherein:
the rule of the plurality of rules defines the automatic application of an effect in association with adding the item of content;
the effect is automatically adding an automatically adding an item of audiovisual content to the GUI; and
the item of audiovisual content is established in dependence upon the added item of content.

14. The template according to claim 1, wherein:
the rule of the plurality of rules comprises applying an effect in association with the added item of content; and
the effect is the addition of a real-time captured element of content established in dependence upon detection of one or more keywords within the added item of content acquired from an external source.

15. The template according to claim 1, wherein:
the rule of the plurality of rules is further established in dependence upon parsing a database of rules to establish the rule of the plurality of rules; and
establishing the rule of the plurality of rules is performed in dependence upon one or more keywords within the added item of content.

16. The template according to claim 1, wherein:
the rule of the plurality of rules is further established in dependence upon selection of the rule of the plurality of rules by the user from a list of rules rendered to the user which are established in dependence upon parsing one or more rule libraries.

17. The template according to claim 1, wherein:
the rule of the plurality of rules is further established in dependence upon selection of the rule of the plurality of rules by the user from a list of rules rendered to the user; and
the computer executable instructions when executed by a microprocessor of the computer system establish the list of rules in dependence upon parsing one or more rule libraries.

18. The template according to claim 1, wherein
the GUI comprises a plurality of regions, each region of the plurality of regions having associated with it a predetermined trigger of the plurality of triggers;
the aspect of the addition of the item of content is a location within the GUI of the added item of content; and
the rule of the plurality of rules comprises a primary rule and a secondary rule where:
the primary rule is defined by a template associated with the rendered GUI and relates to formatting; and
the secondary rule establishes parsing of the added item of content to detect one or more keywords and acquiring from an external source a real-time captured element of content in dependence upon the detected of one or more keywords.

19. The template according to claim 1, further comprising retrieving with the microprocessor data from another non-volatile non-transitory memory, the data comprising:
a first portion defining the GUI to be rendered by the software application;
a second portion defining the plurality of triggers; and
a third portion defining the plurality of rules.

\* \* \* \* \*